US012667956B2

(12) United States Patent
Muniz, Jr. et al.

(10) Patent No.: US 12,667,956 B2
(45) Date of Patent: Jun. 30, 2026

(54) ROBOTIC ASSEMBLIES AND METHODS OF USE

(71) Applicant: Ascender Systems, Incorporated, Poway, CA (US)

(72) Inventors: Jorge Muniz, Jr., Poway, CA (US); Ethan Alexander Muniz, Poway, CA (US)

(73) Assignee: ASCENDER SYSTEMS, INCORPORATED, Poway, CA (US)

( * ) Notice: Subject to any disclaimer, the term of this patent is extended or adjusted under 35 U.S.C. 154(b) by 147 days.

(21) Appl. No.: 18/526,137

(22) Filed: Dec. 1, 2023

(65) Prior Publication Data

US 2024/0181628 A1     Jun. 6, 2024

Related U.S. Application Data

(60) Provisional application No. 63/429,385, filed on Dec. 1, 2022.

(51) Int. Cl.
| | |
|---|---|
| *B25J 5/00* | (2006.01) |
| *B25J 5/02* | (2006.01) |
| *B25J 9/16* | (2006.01) |
| *B25J 19/00* | (2006.01) |

(52) U.S. Cl.
CPC ............... *B25J 5/02* (2013.01); *B25J 9/1664* (2013.01); *B25J 19/005* (2013.01)

(58) Field of Classification Search
CPC ................. B25J 5/02; G05B 19/41815; G05B 19/40252; G05B 19/4189; G05B 19/40519
See application file for complete search history.

(56) References Cited

U.S. PATENT DOCUMENTS

| | | | | |
|---|---|---|---|---|
| 2018/0339456 A1* | 11/2018 | Czinger | ............... | B29C 64/379 |
| 2021/0172557 A1* | 6/2021 | Wehlin | ................. | G01N 29/225 |

FOREIGN PATENT DOCUMENTS

WO      WO-2017182990 A1 * 10/2017    ................ B25J 5/02

* cited by examiner

*Primary Examiner* — Karen Masih
(74) *Attorney, Agent, or Firm* — Harper & Bates LLP; Shannon W. Bates

(57)      ABSTRACT

A robotic assembly includes a robot and a module, wherein the robot is configured to selectively move the module substantially linearly. The robot includes at least one motor-driven component. The robot is configured to separate from the module after selectively moving the module substantially linearly to a desired location. The module is configured to selectively retain its position after the robot selectively moves the module substantially linearly to a desired location. The module selectively performs a function while the module selectively retains its position in the desired location. The module is configured to selectively release its position to remove the module from the desired location.

19 Claims, 27 Drawing Sheets

ROBOTIC ASSEMBLIES AND METHODS OF USE

CROSS-REFERENCE TO RELATED APPLICATIONS

This application is based on and claims the benefit of priority to U.S. Provisional Patent Application Ser. No. 63/429,385, filed Dec. 1, 2022 and entitled "Robotic Assemblies and Methods of Use", which is incorporated by reference herein in its entirety for all purposes.

TECHNICAL FIELD

The present disclosure relates to robotic assemblies and methods for climbing vertical structures, traversing horizontal structures, and/or installing or carrying a leave-behind module.

BACKGROUND

Traversing vertical or horizontal structures safely and efficiently requires either expensive lift equipment, complicated scaffolding, safety harnesses and personal protective equipment, and special training or licensing to deploy. Too often, these critical requirements are bypassed, either due to lack of resources, training, experience, or enforcement, ultimately exposing personnel to the dangers of serious injury or death. To minimize these occurrences, the inventors have developed robotic assemblies that enable quick traversal of those structures to include such examples as pipe, poles, columns, and trees.

SUMMARY

The present disclosure relates to various implementations of robotic assemblies and methods for traversing both vertical or horizontal structures and/or carrying, retrieving, or installing a leave-behind module.

The robotic assemblies and methods of the present disclosure permit the traversing (hereafter presumed across both vertical and horizontal structures) and, if desired, installation of leave-behind modules on substantially vertical structures, such as palm trees, poles, posts, and columns, or substantially horizontal structures such as cross beams, bridges, cantilever, cables, and/or pipes, by a user who can operate the robotic assemblies remotely from a safe location.

The robotic assemblies and methods of the present disclosure may be lightweight such that a single user can pack and carry the system to the designated location, as well as operate the system, without assistance from another person.

The robotic assemblies and methods of the present disclosure are simple to use, requiring no extensive training, licensing, or certifications, such that amateur installers can operate the assemblies and perform the methods of traversing a structure by following a set of instructions. The robotic assemblies and methods of the present disclosure are also safer to use than traditional systems, significantly reducing the risk of injury.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols, including like reference colors, in the various drawings indicate like elements.

DETAILED DESCRIPTION

The present disclosure relates to various implementations of robotic assemblies and methods for climbing, traversing, carrying and/or installing a leave-behind module on substantially vertical or horizontal structures. The robotic assemblies may be motor operated, and a motor controller may be implemented to enable a user to operate the robotic assemblies from a safe location using a remote controller.

The robotic assemblies of the present disclosure may comprise a robot and a module. In some implementations, the robot traverses in a substantially linear direction such that the robot is operable to move up and down a substantially straight and vertical structure, such as a palm tree base, a light pole, a pipe, or a column, or back and forth across a substantially straight structure, such as a cross beam, a bridge, a cantilever, a cable, and/or a pipe, whether such straight structures are disposed horizontally or along an angle. The robot may be motorized, with motors operable to account for imperfections in the substantially straight structures. As described herein, the robot may be referred to as a climbing or traversing robot.

In some implementations, the module selectively traverses in a substantially circumferential direction around the robot, such that the module is operable to pull up a string of lights, rope, cable, ribbons, or the like, that are initially located at ground level and then wrap them around a substantially vertical structure, beginning at a desired height. The module may be motorized, with motors operable to enable the module to lift the string of lights while traversing circumferentially around the robot. This circumferential traversing functionality may also serve to further enhance the functionality of one or several of the use-cases applications listed infra. As described herein, the module may be referred to as the circumferential module.

Figure 1:
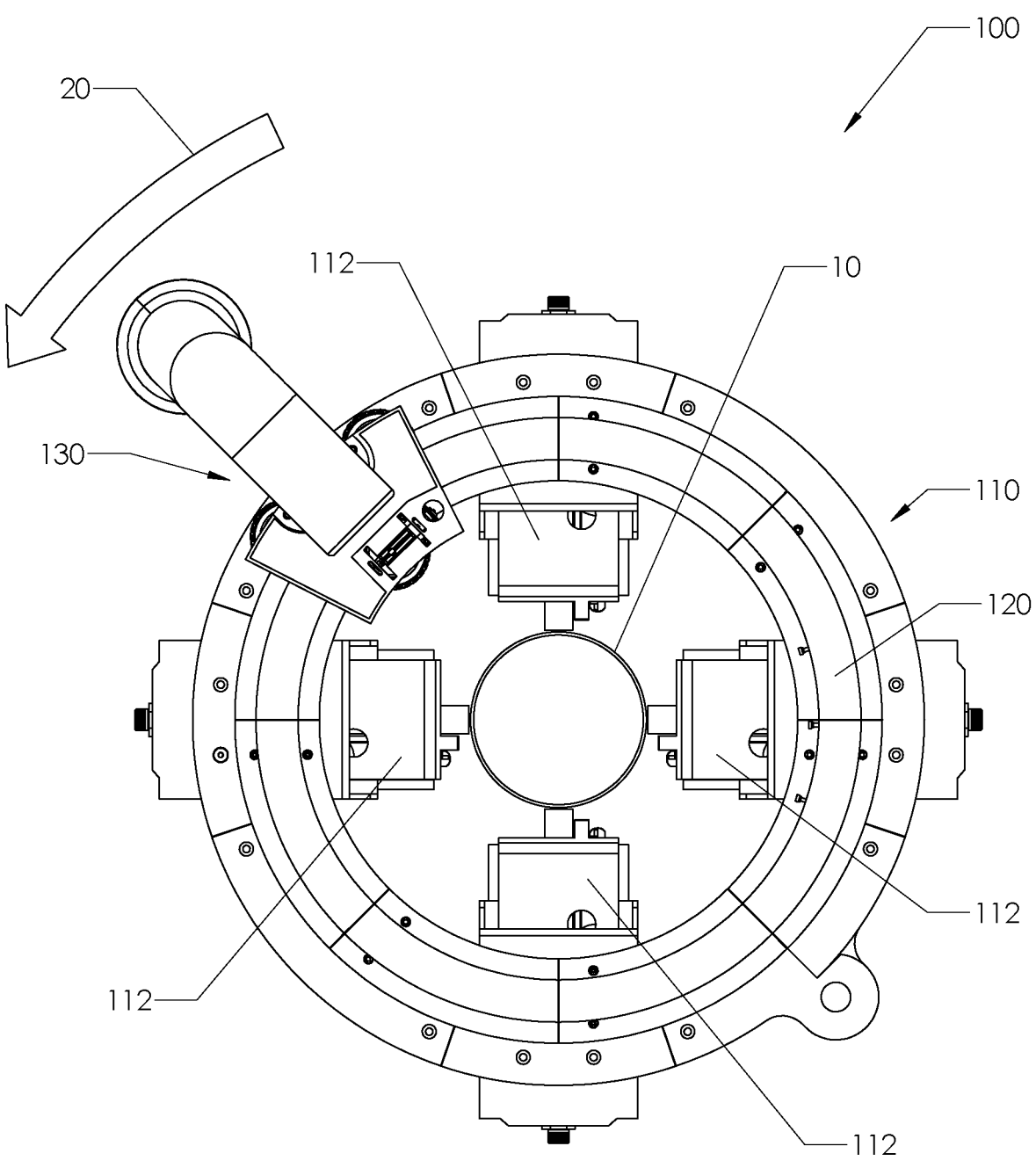
FIG. 1 illustrates a top down, schematic view of an implementation of a robotic assembly according to the present disclosure, the robotic assembly shown positioned on a representative substantially vertical structure.

FIG. 1 depicts a top down, schematic view of an implementation of a robotic assembly 100 according to the present disclosure shown coupled to a representative substantially vertical structure 10, such as a PVC pipe. The robotic assembly 100 comprises a climbing robot 110 comprising a plurality of motorized "cars" 112 shown surrounding the substantially vertical structure 10. The robotic assembly 100 further comprises an I-beam rail system 120 that sits atop and moves with the climbing robot 110, and a circumferential module 130 that travels circumferentially along the rail system 120, as represented by arrow 20.

Figure 2:
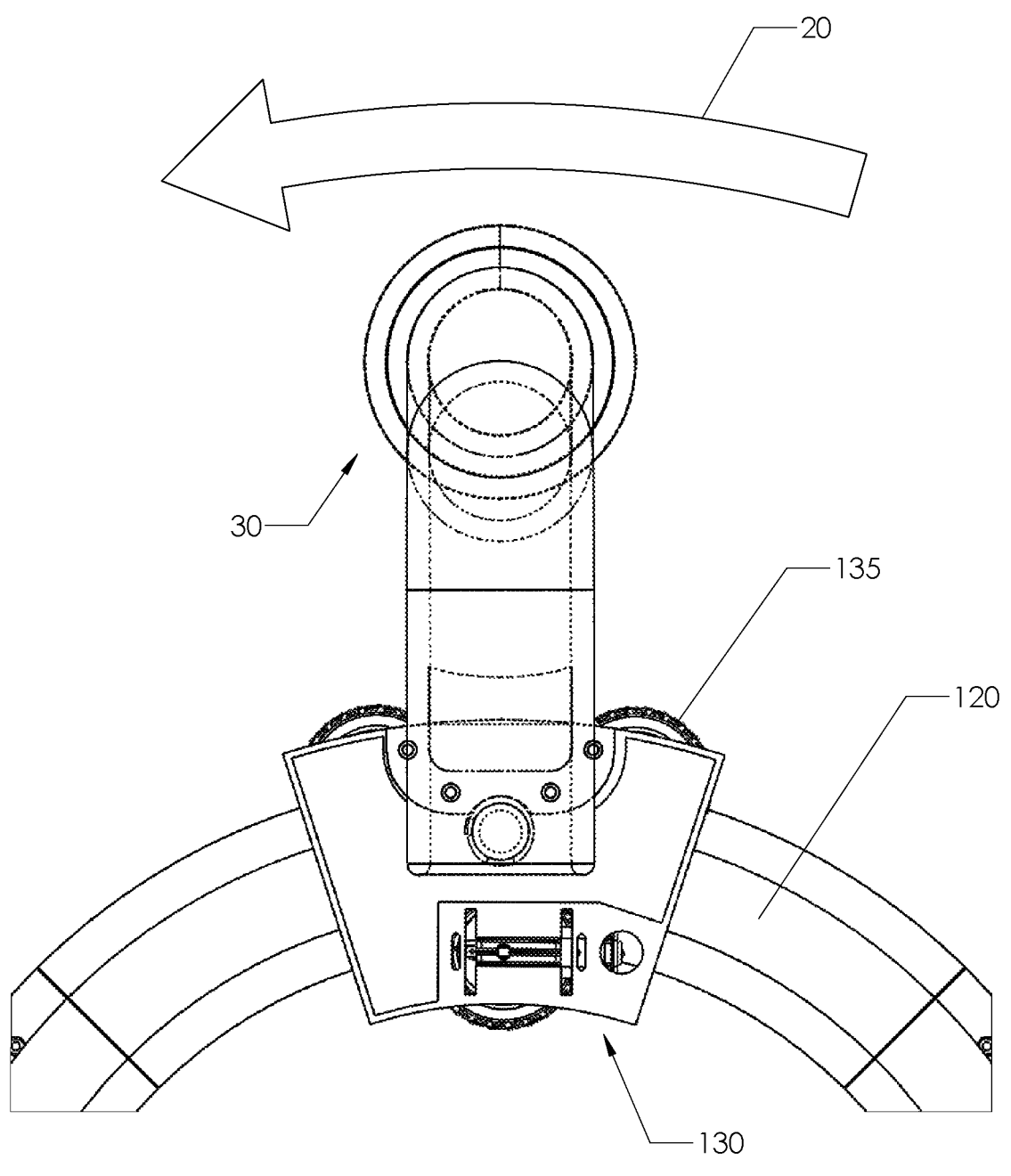
FIG. 2 illustrates a top down, partially see-through, schematic view of an implementation of a circumferential module of the robotic assembly of FIG. 1, according to the present disclosure.

FIG. 2 illustrates a top down, partially see-through, schematic view of an implementation of the circumferential module 130 of the robotic assembly 100 of FIG. 1, according to the present disclosure. The circumferential module 130 comprises a multi-tire subsystem 135 that locks the circumferential module onto the rail system 120 that surrounds the target substantially vertical structure 10 to be encircled, such as a tree, a pipe, a pole, or a column. The circumferential module 130 will permit a pass through 30 for strings of lights, rope, cable, ribbons, or the like that will be pulled up as the circumferential module 130 traverses the rail system 120 and thereby circles the target tree/pipe/pole/column. This circumferential traversing functionality may also serve to further enhance functionality of one or several of the use-cases applications listed infra.

Figure 3:
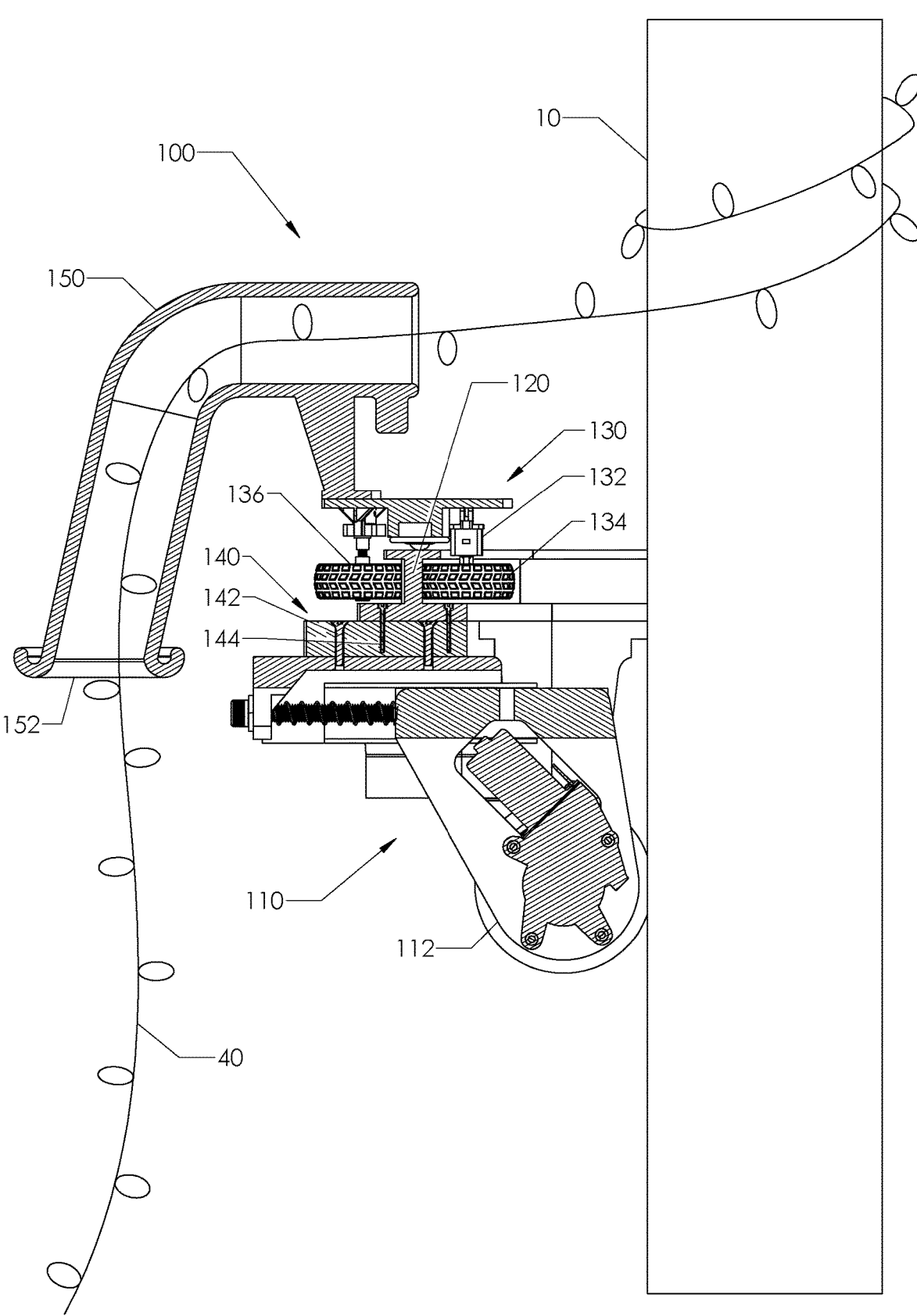
FIG. 3 illustrates a side, schematic view of the robotic assembly of FIG. 1, according to the present disclosure, the robotic assembly shown positioned on a representative substantially vertical structure.
Figure 4:
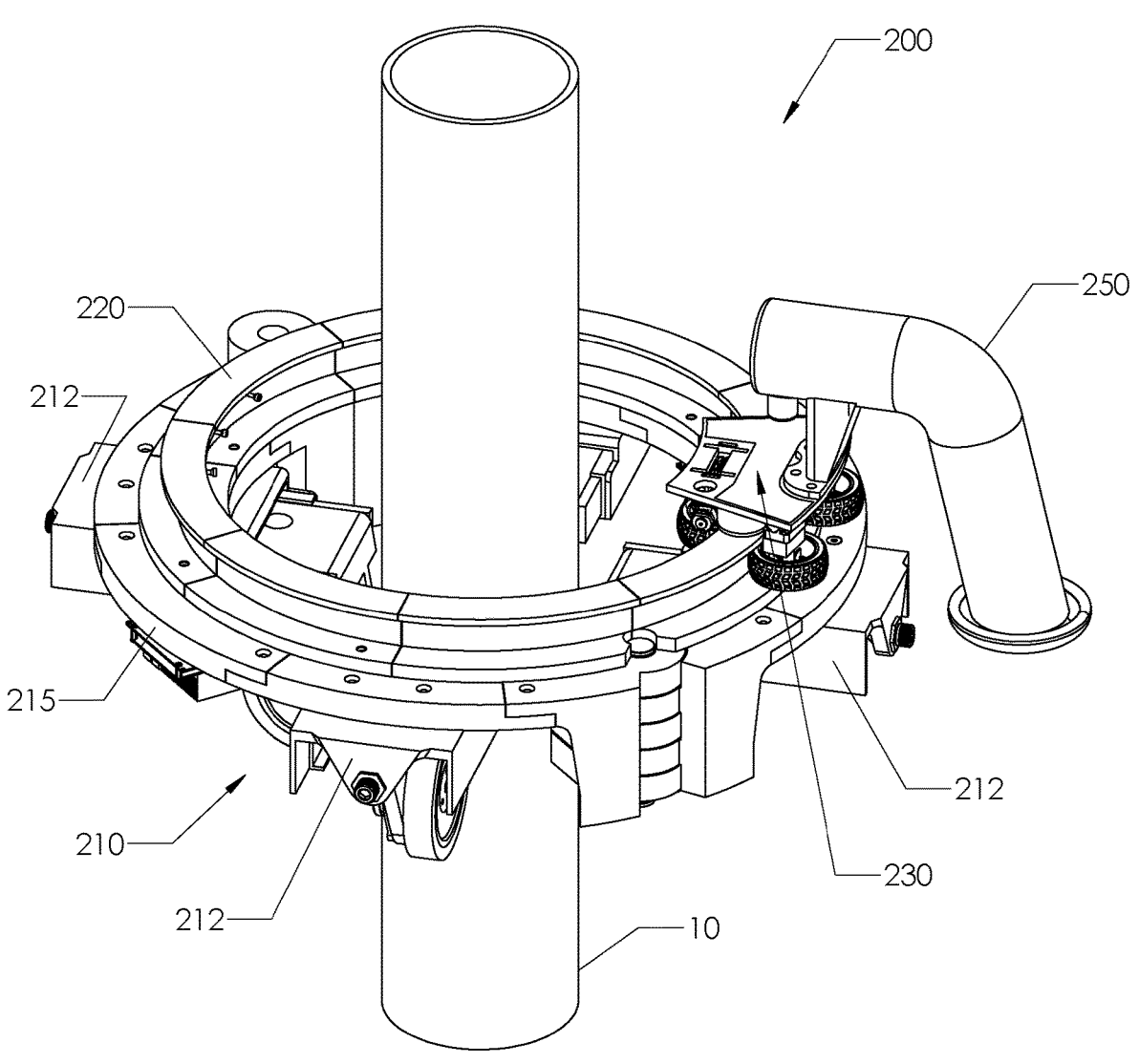
FIG. 4 illustrates a perspective, schematic view of another implementation of a robotic assembly according to the present disclosure, the robotic assembly shown positioned on a representative substantially vertical structure.
Figure 5:
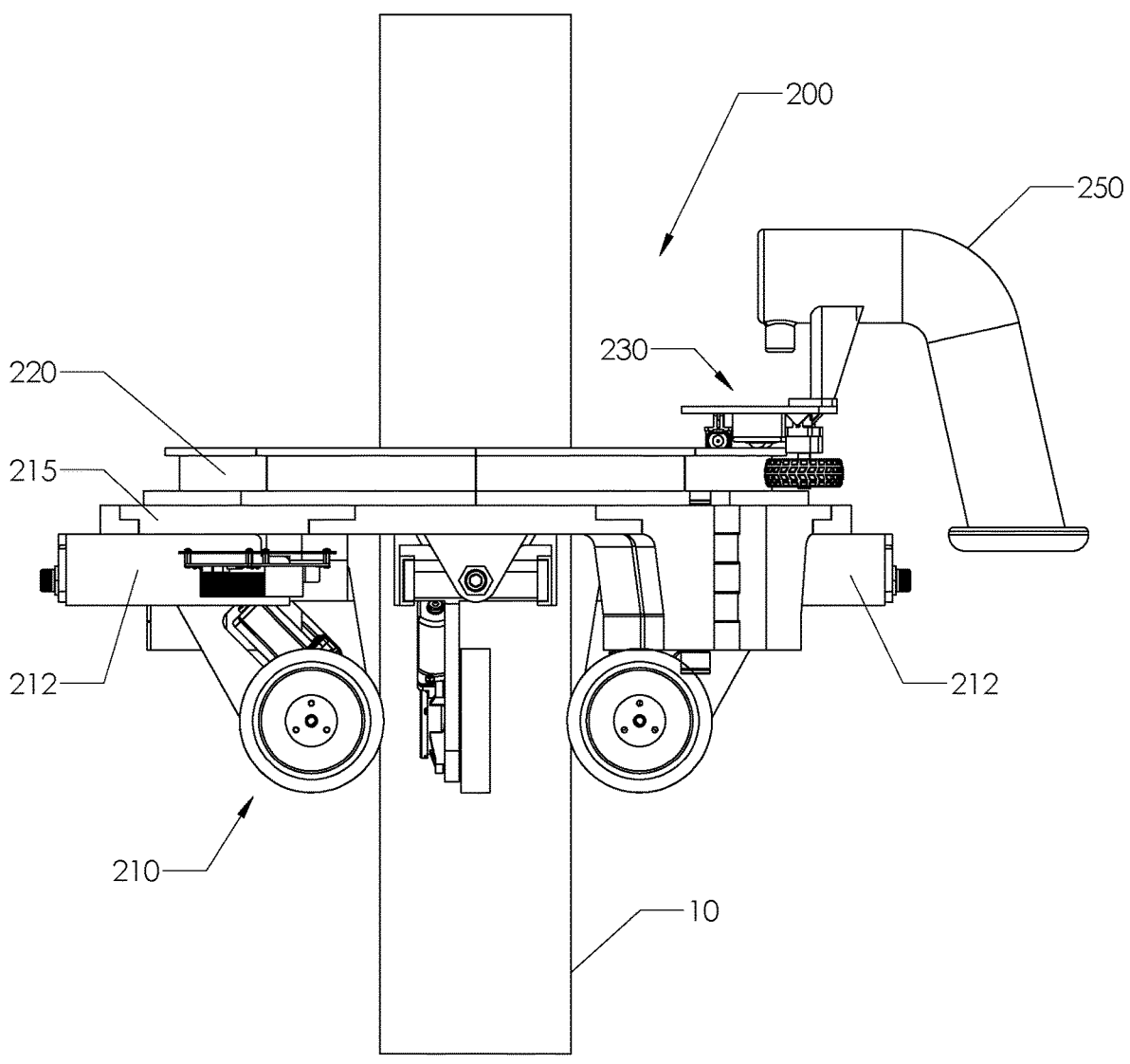
FIG. 5 illustrates a side, schematic view of the robotic assembly of FIG. 4, according to the present disclosure, the robotic assembly shown positioned on a representative substantially vertical structure.
Figure 6:
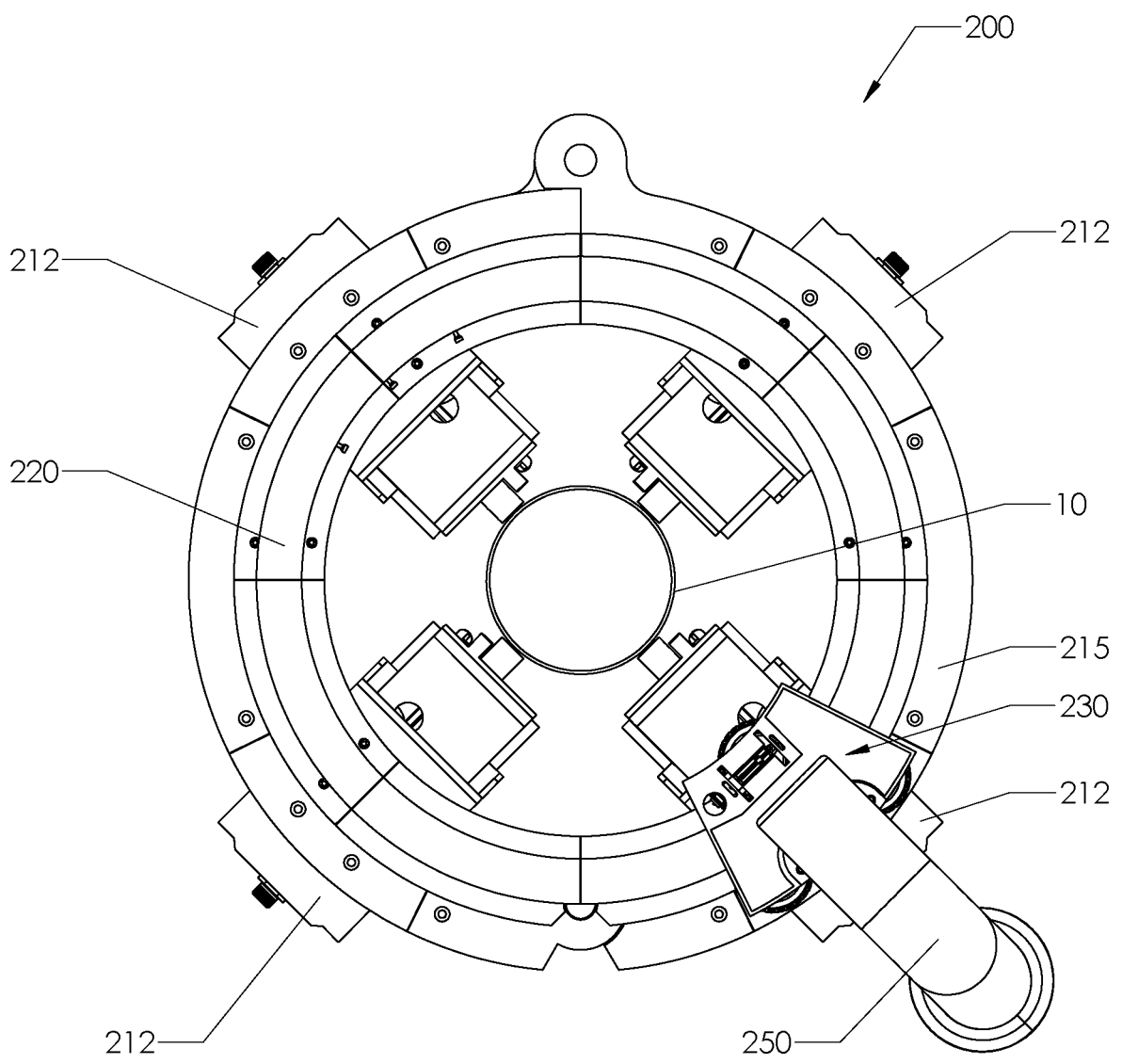
FIG. 6 illustrates a top down, schematic view of the robotic assembly of FIG. 4, according to the present disclosure, the robotic assembly shown positioned on a representative substantially vertical structure.
Figure 7:
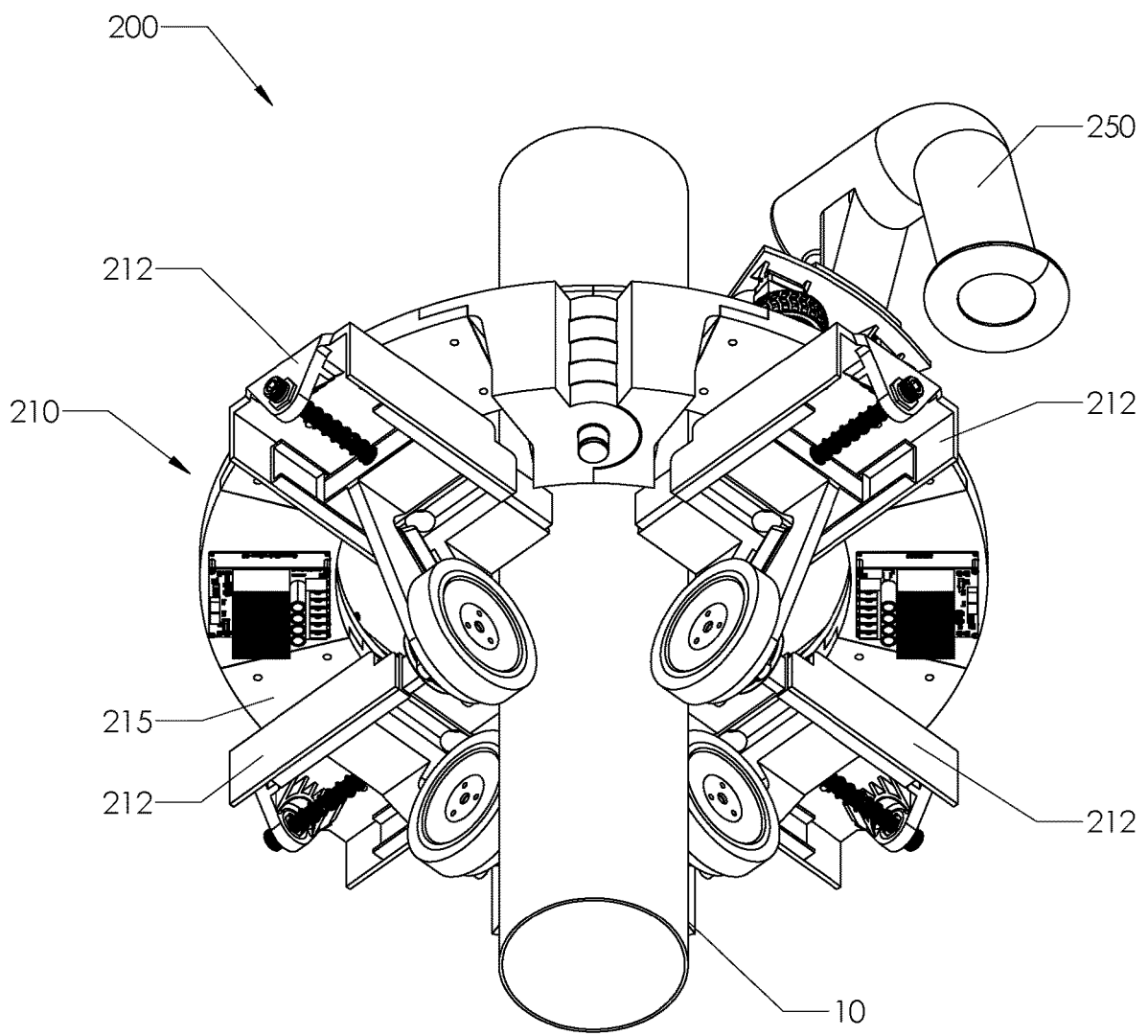
FIG. 7 illustrates a bottom up, perspective, schematic view of the robotic assembly of FIG. 4, according to the present disclosure, the robotic assembly shown positioned on a representative substantially vertical structure.

FIG. 3 illustrates a side, schematic view of the robotic assembly 100 of FIG. 1, according to the present disclosure. The robotic assembly 100 further comprises a common cantilever bridge 140 coupled, such as by bolts 142, 144, to both at least one car 112 of the climbing robot 110 and the rail system 120 that supports the circumferential module 130. The circumferential module 130 may comprise a motor 132, a motor-driven inner tire 134, and non-motor driven other tires 136. The robotic assembly 100 may further comprise a funnel mechanism 150 with a pass-through port 152 that may be a separate mechanism coupled to the circumferential module 130 or may be formed integrally with the circumferential module 130.

In operation, the climbing robot 110 will drive the entire robotic assembly 100 up the substantially vertical structure 10 while the circumferential module 130 lifts and carries a string 40 of lights, rope, cable, ribbons, or the like along from an end thereof. Once the robotic assembly 100 reaches a desired height, the climbing robot 110 may remain stationary while the circumferential module 130 traverses the rail system 120 circumferentially to encircle the substantially vertical structure 10 and starts pulling the selected medium 40 (string of lights, rope, cable, ribbons, or the like)

up and around the vertical structure 10. Then the climbing robot 110 slowly drives the entire robotic assembly 100 down the substantially vertical structure 10 while the circumferential module 130 continues traversing the rail system 120 circumferentially to encircle the substantially vertical structure 10 along its length with the aforementioned selected medium 40 as the climbing robot 110 continues moving downwardly.

FIGS. 4-7 illustrate a perspective view, a side view, a top-down view, and a bottom-up view, respectively, of another implementation of a robotic assembly 200 according to the present disclosure, the robotic assembly 200 shown positioned on a representative substantially vertical structure 10. In this implementation, the robotic assembly 200 comprises a climbing robot 210 with a plurality of spring-loaded, motor-driven cars 212, best shown in FIGS. 6 and 7 (as well as FIG. 12, to be discussed infra), coupled to a common bridge 215 that supports a circular I-beam rail system 220 to which a motor-driven circumferential module 230, best shown in FIG. 4-6 (as well as FIG. 10, to be discussed infra), is locked. The robotic assembly 200 further comprises a funnel mechanism 250 coupled to the circumferential module 230 through which the aforementioned selected medium 40, such as a string of lights, is carried during the ascent and then dispensed during the circumferential operation.

Figure 8:
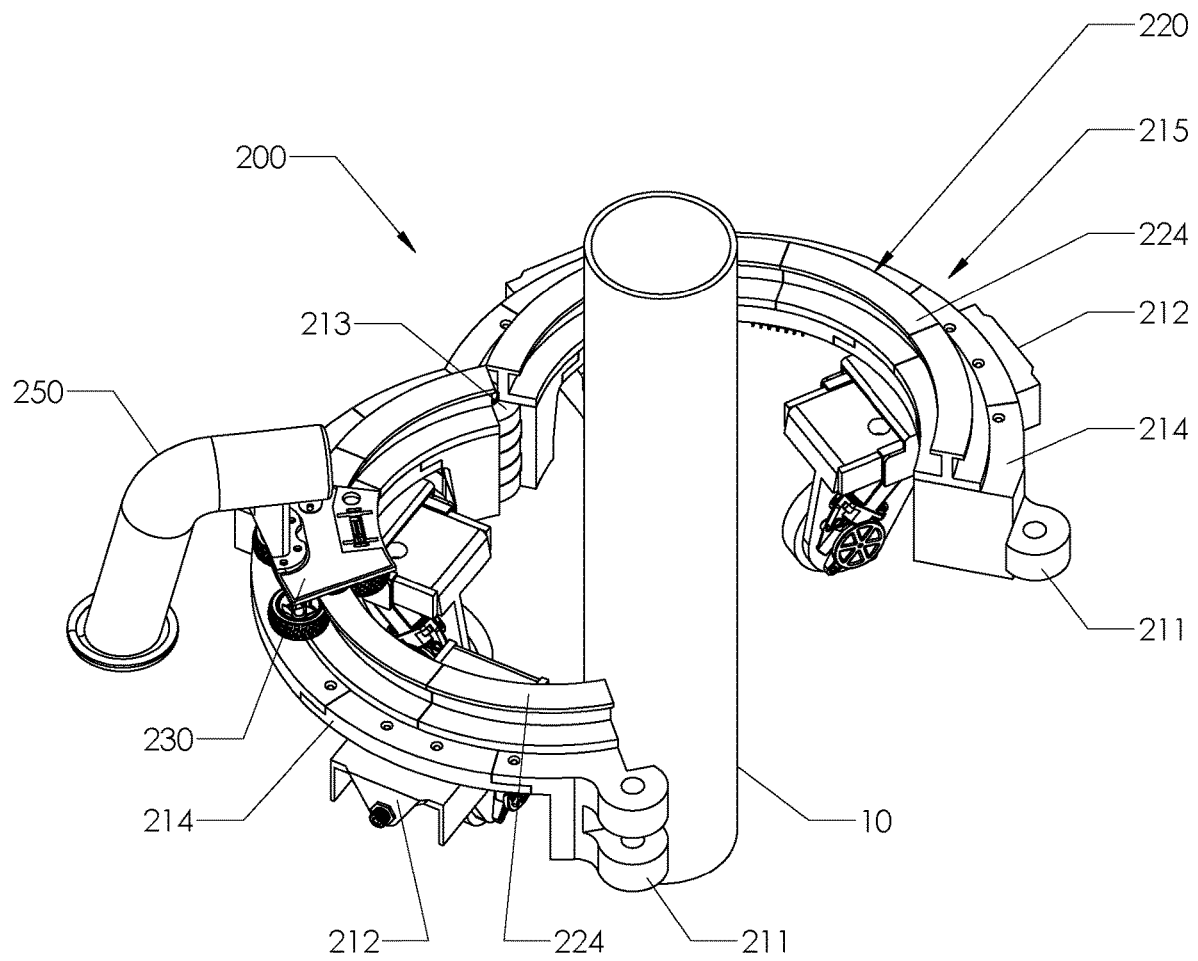
FIG. 8 illustrates a perspective, schematic view of the robotic assembly of FIG. 4, according to the present disclosure, wherein a latch and hinge subsystem shown in FIG. 8 is in an open position to enable the robotic assembly to be coupled into position on a representative substantially vertical structure.
Figure 9:
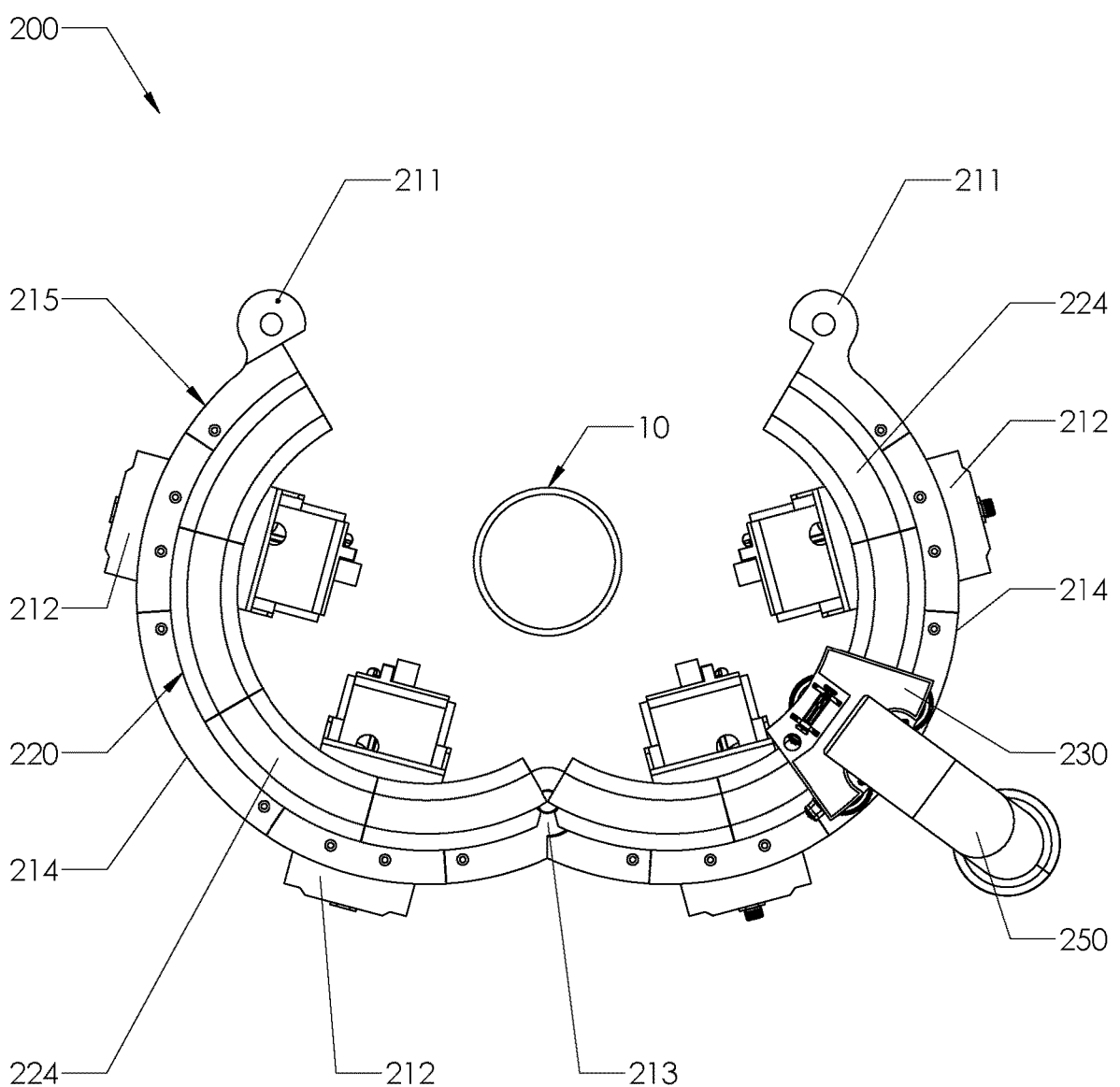
FIG. 9 illustrates a top down, schematic view of the robotic assembly of FIG. 4, according to the present disclosure, wherein the latch and hinge subsystem is in the open position wherein a latch and hinge subsystem shown in FIG. 8 is in an open position to enable the robotic assembly to be coupled into position on a representative substantially vertical structure.

FIG. 8 and FIG. 9 illustrate a perspective view and a top-down view, respectively, of the robotic assembly 200 of FIGS. 4-7, but with a latch 211 and hinge 213 subsystem in an open position to enable the robotic assembly 200 to be coupled around a lower end of a representative substantially vertical structure 10 before the robotic assembly 200 begins climbing the structure 10. In more detail, the common bridge 215 may have a "clam-shell" design comprising two semicircular portions 214 joined by a hinge 213 that allows the two portions 214 to swing away from one another to an open position or toward one another to a closed position. Similarly, the rail system 220 may be formed of two corresponding semicircular sections 224 that are carried on the two semi-circular portions 214 of the bridge 215. Opposite the hinge is a latch formed of interacting components formed on the two semicircular portions of the bridge. The latch is disengaged to allow the latch and hinge subsystem to open as shown in FIGS. 8-9, and the latch is engaged to maintain the latch and hinge subsystem in the closed position as shown in FIGS. 4-7.

Figure 10:
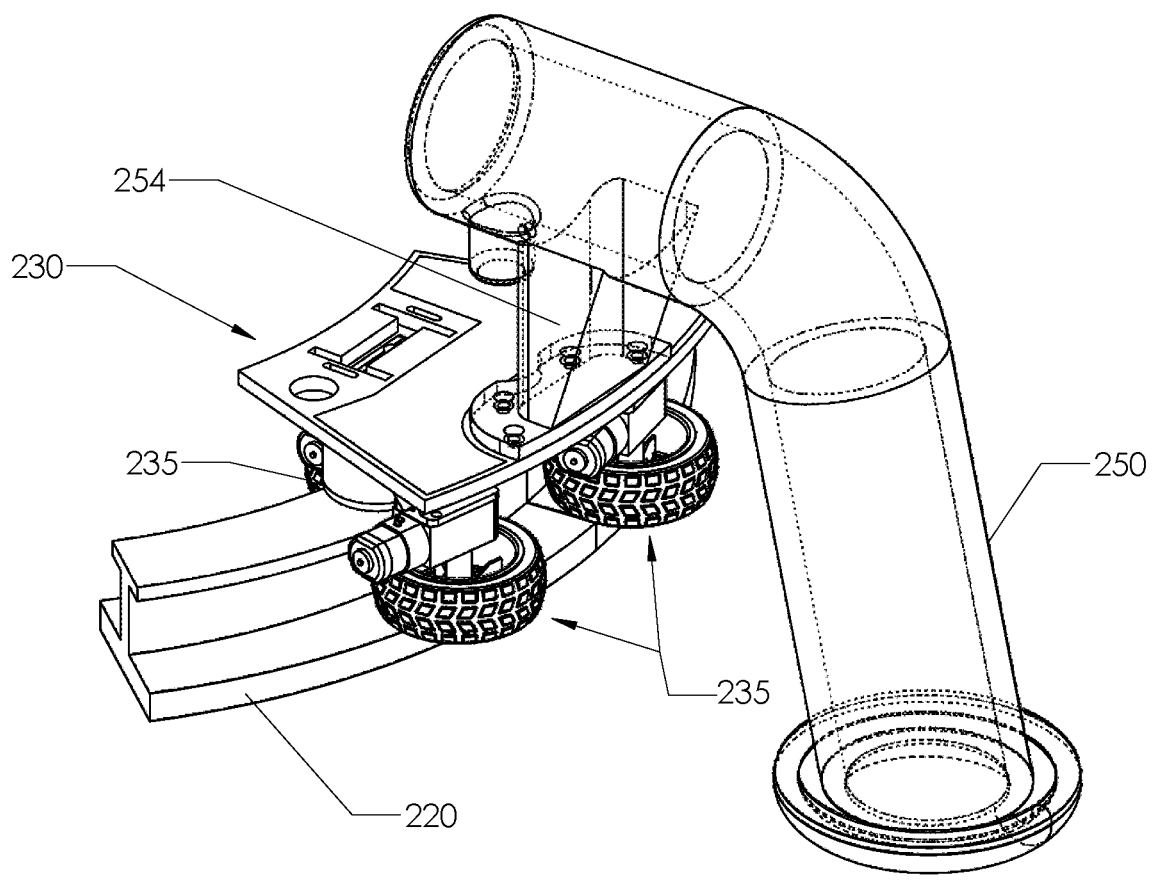
FIG. 10 illustrates a close-up, side, schematic view of an implementation of a circumferential module and an implementation of a funnel mechanism of the robotic assembly of FIG. 4, according to the present disclosure.
Figure 11:
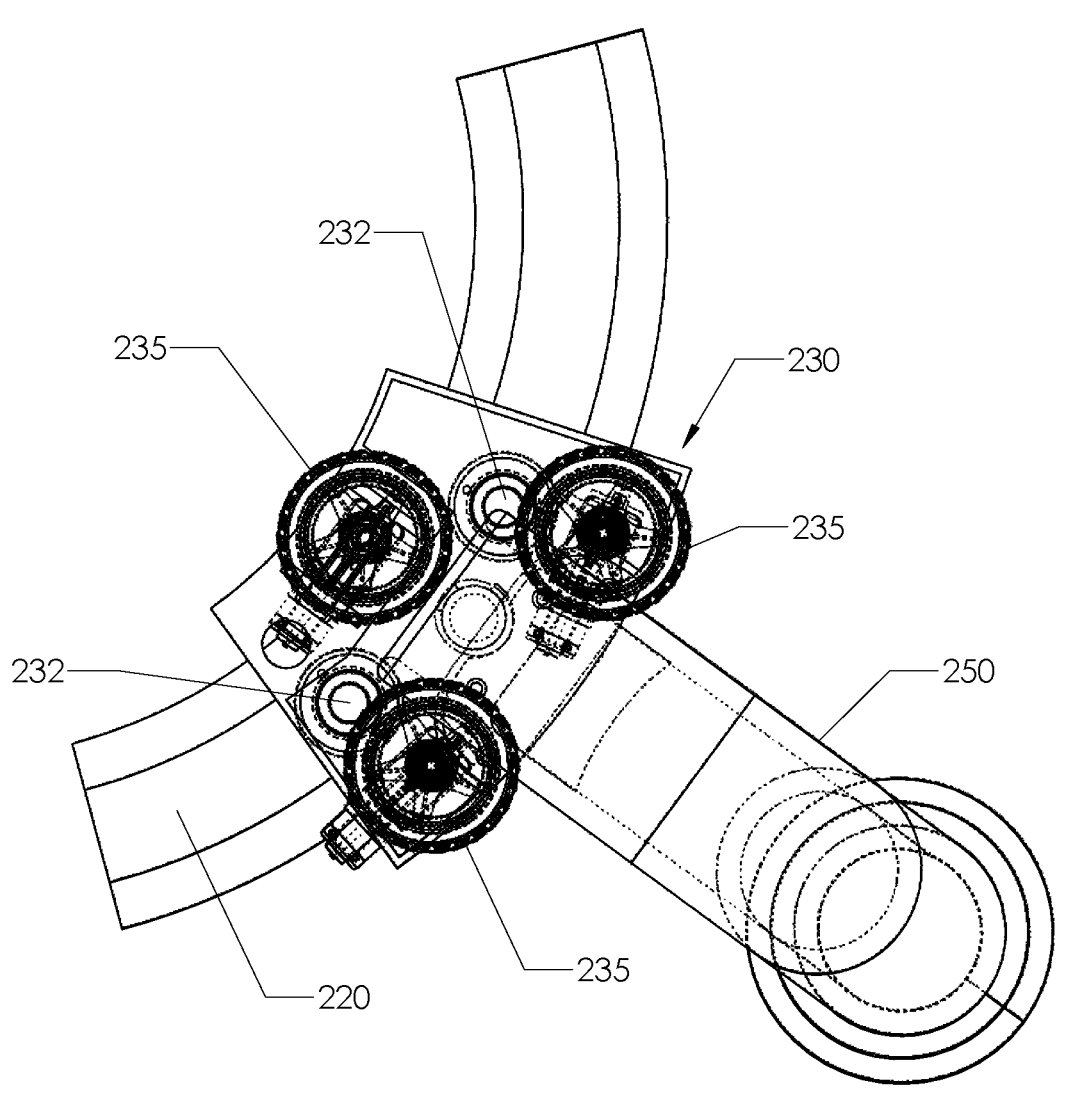
FIG. 11 illustrates a close-up, top down, schematic view of the circumferential module and funnel mechanism shown in FIG. 10, according to the present disclosure.

FIG. 10 and FIG. 11 illustrate close-up, partially see-through, side and top-down views, respectively, of an implementation of a circumferential module 230 and an implementation of a funnel mechanism 250 of the robotic assembly 200 of FIGS. 4-9, according to the present disclosure. As depicted, the circumferential module 230 comprises a multi-tire subsystem 235 that locks the circumferential module 230 in place on the I-beam rail system 220. The circumferential module 230 further comprises internal rollers 232, best shown in FIG. 11, that engage the top of the rail system 220 to promote smooth movement therebetween. As depicted, the funnel mechanism 250 is coupled by a stand 254 to the top of the circumferential module 230 and toward an outer edge such that the funnel mechanism 250 extends above the circumferential module 230 and outwardly therefrom. This positioning permits the pass through of a string of lights, rope, cable, ribbons, or the like, from below the climbing robot 210 and the circumferential module 230 and onto the tree/pipe/pole/column 10.

Figure 12:
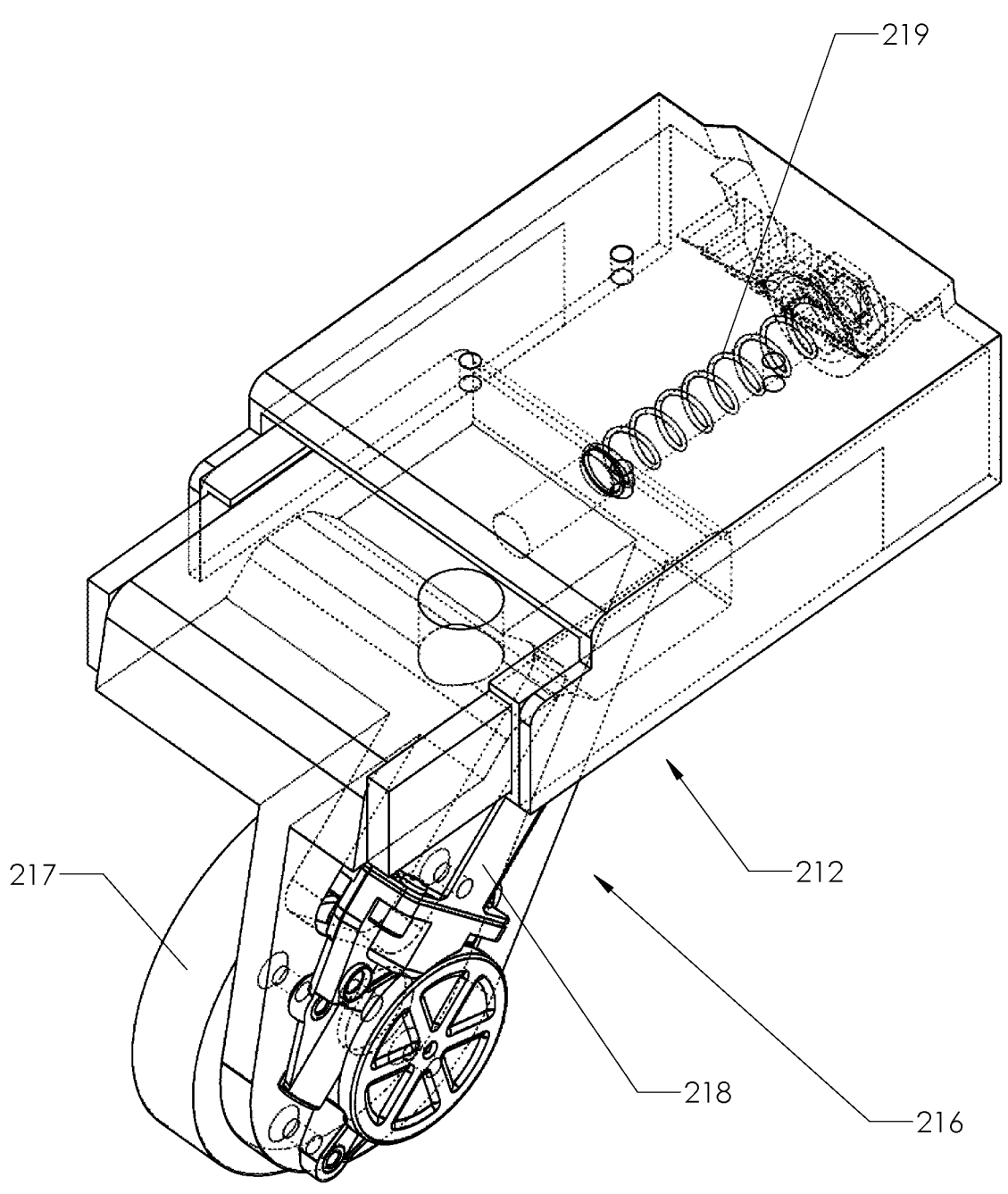
FIG. 12 illustrates a close-up, perspective, partially see-through, schematic view of an implementation of a spring-loaded motor mechanism on a traversing robot of the robotic assembly of FIGS. 4, according to the present disclosure.
Figure 13:
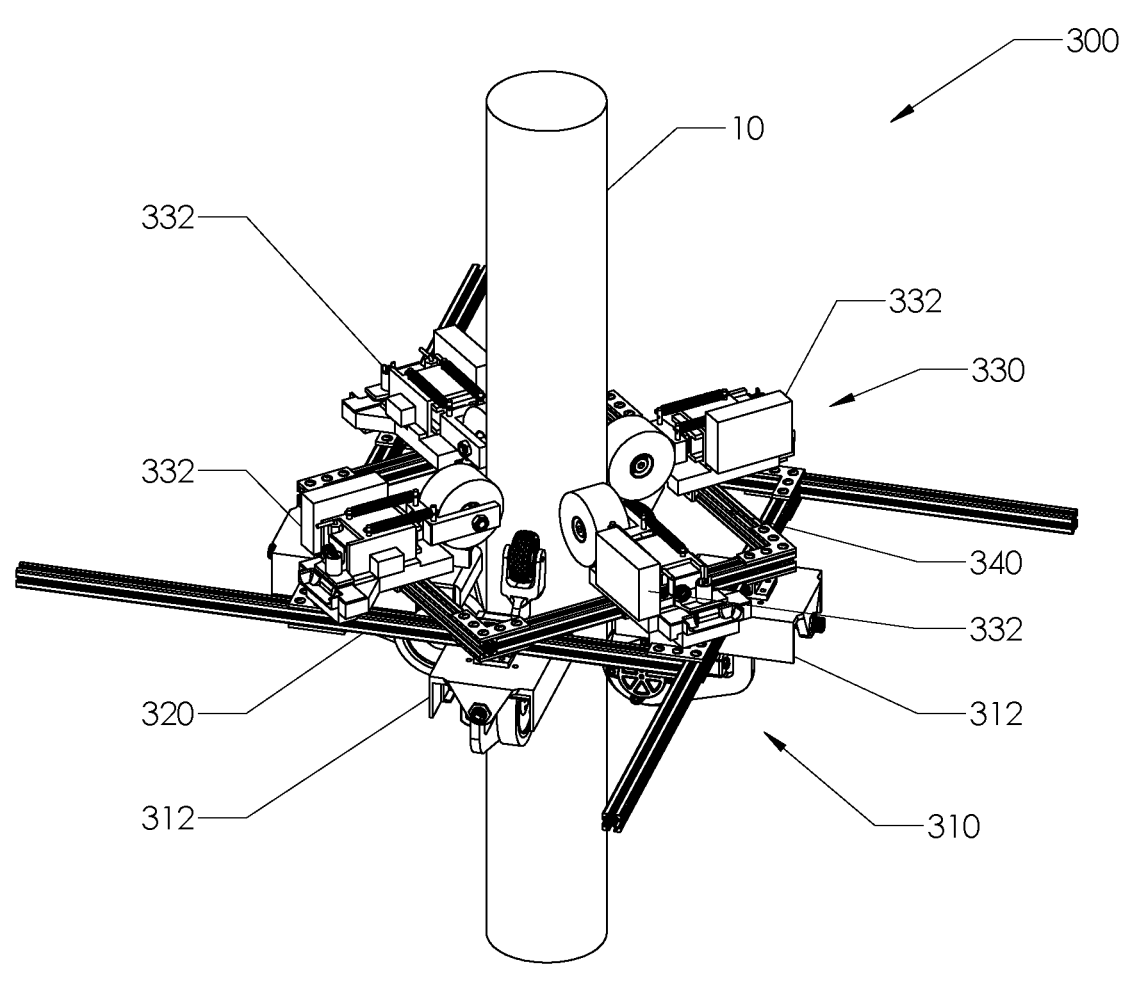
FIG. 13 illustrates a perspective, schematic view of another implementation of a robotic assembly according to the present disclosure, the robotic assembly shown positioned on a representative substantially vertical structure.
Figure 14:
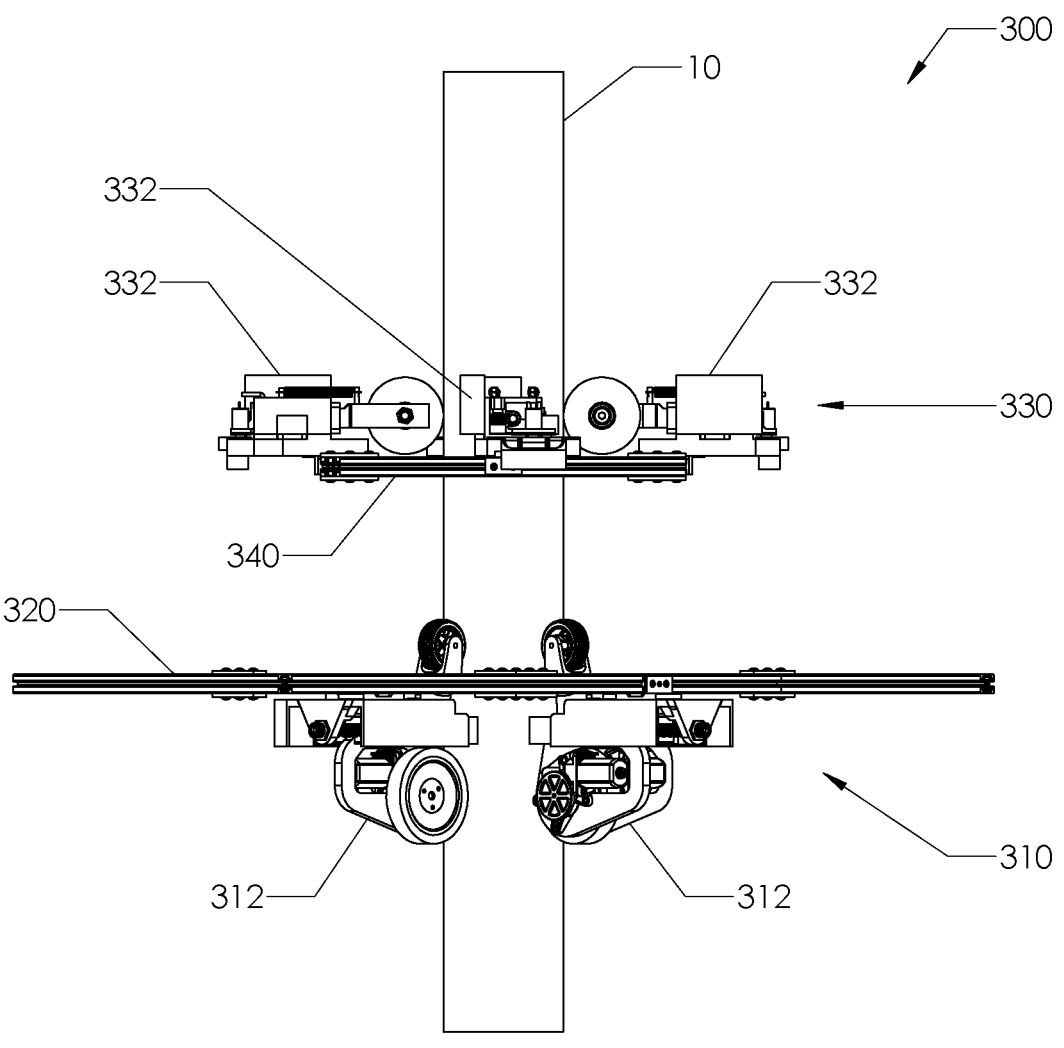
FIG. 14 illustrates a side, schematic view of the robotic assembly of FIG. 13, according to the present disclosure, the robotic assembly shown positioned on a representative substantially vertical structure.
Figure 15:
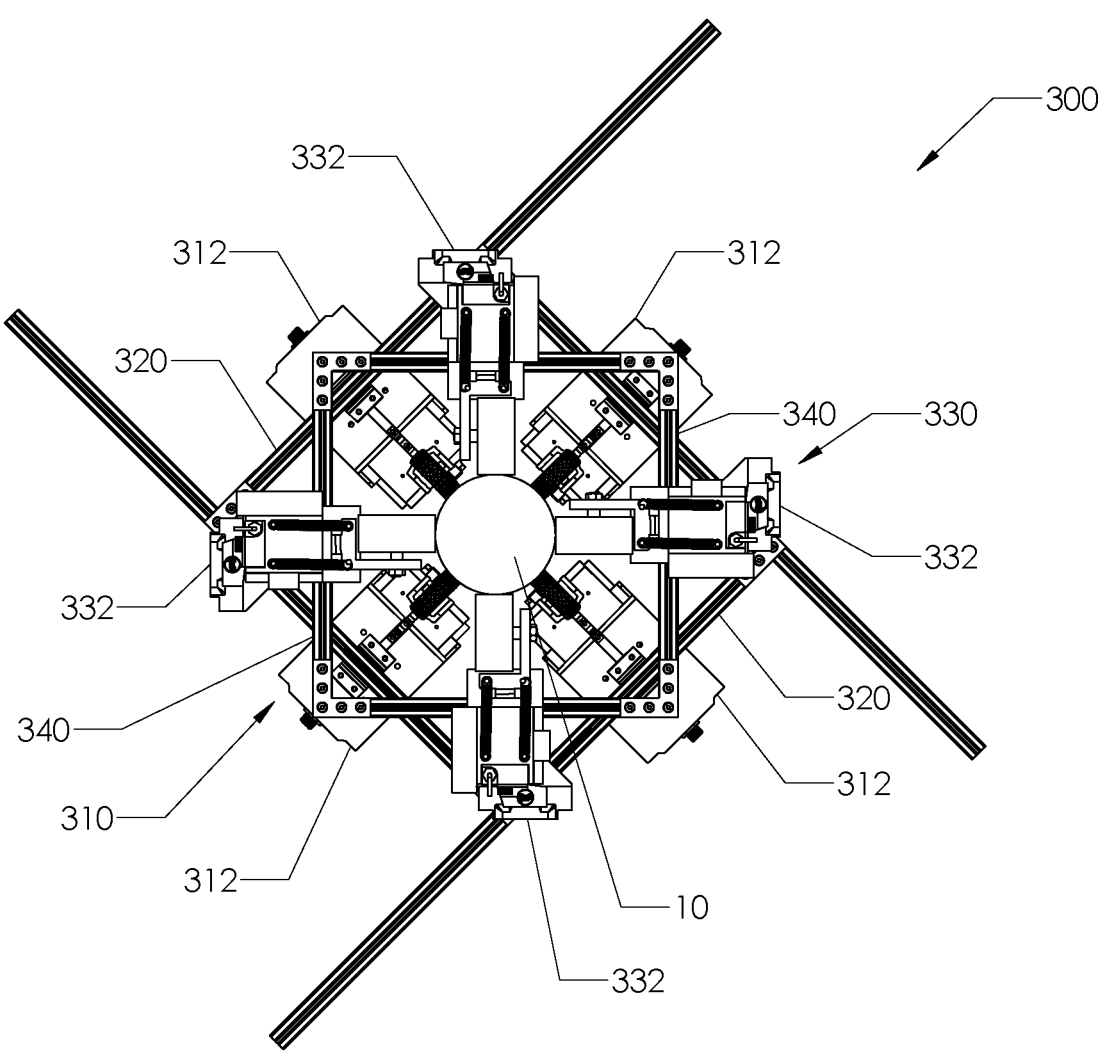
FIG. 15 illustrates a top down, schematic view of the robotic assembly of FIG. 13, according to the present disclosure, the robotic assembly shown positioned on a representative substantially vertical structure.
Figure 16:
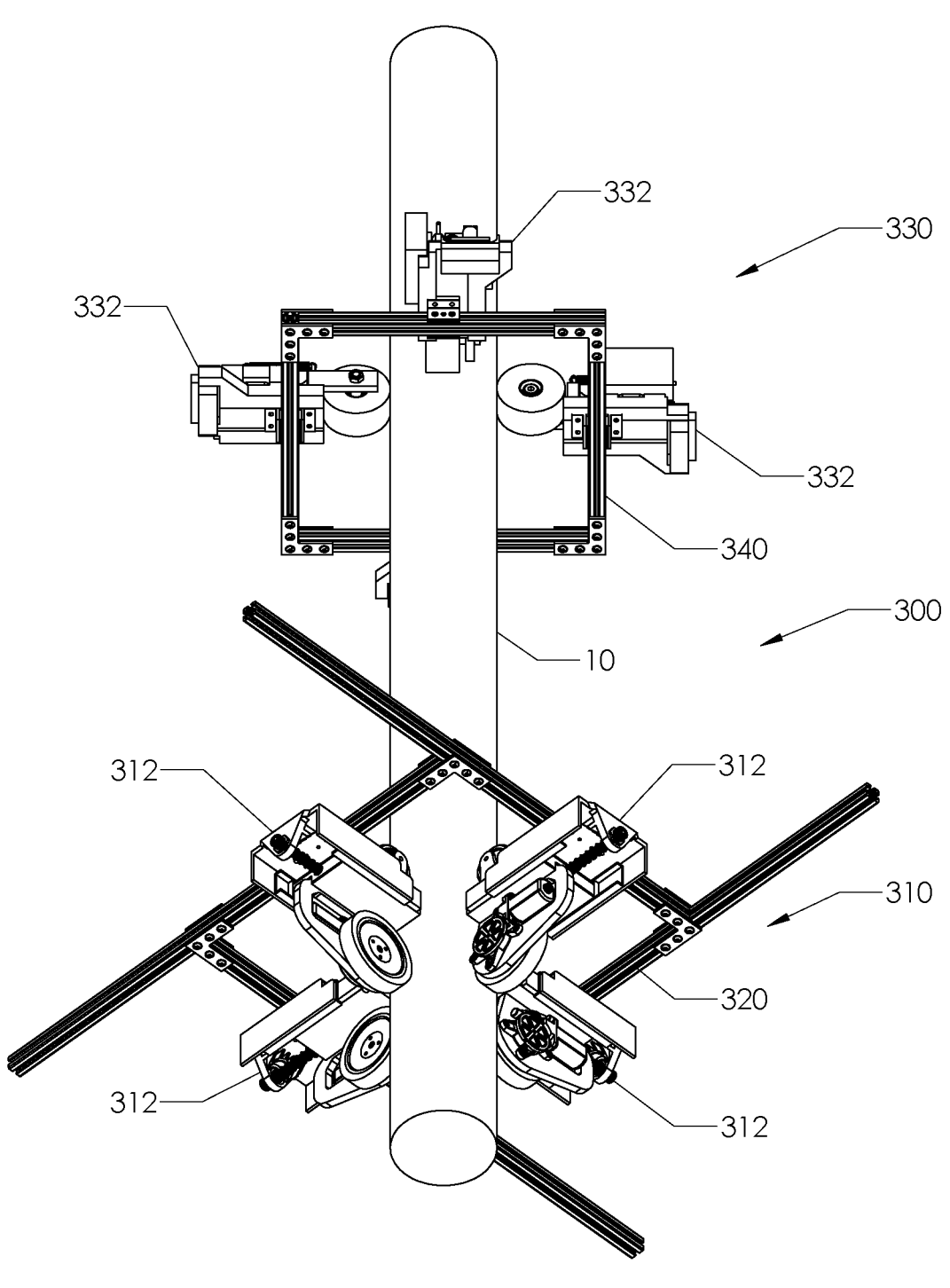
FIG. 16 illustrates a bottom up, perspective, schematic view of the robotic assembly of FIG. 13, according to the present disclosure, the robotic assembly shown positioned on a representative substantially vertical structure.

FIG. 12 illustrates a close-up, perspective, partially see-through, schematic view of an implementation of a spring-loaded motor mechanism 216 on one of the cars 212 of the climbing robot 210 of the robotic assembly of FIGS. 4-9, according to the present disclosure. As depicted, the motor 218 driving the wheel 217 is coupled by a spring 219 disposed internally of the body of the car 212.

In other implementations of the robotic assemblies of the present disclosure, the module may be moved by the climbing/traversing robot to a desired location and then left behind by the climbing/traversing, such that the module is capable of either being secured in its location so that the climbing/traversing robot may be returned and reused in other applications or as a supplementation to the climbing robot's functions. This type of module may be referred to as a leave-behind module and may be operable to perform functions including, but not limited to, functions such as those listed infra.

FIGS. 13-16 illustrate a perspective view, a side view, a top-down view, and a bottom-up view, respectively, of another implementation of a robotic assembly 300 according to the present disclosure. In FIGS. 13-16, the robotic assembly 300 is shown positioned on a representative substantially vertical structure 10, although the use case would not be limited to just vertical applications. In this implementation, the robotic assembly 300 comprises a climbing robot 310 and/or a leave-behind module 330, with the climbing robot 310 comprising a plurality of either spring-loaded and/or linear encoder positioned, motor-driven cars 312, best shown in FIGS. 14 and 16, coupled to a sliding bar and bracketed system 320 that supports each of the motor mount and assemblies, best shown in FIG. 13-15. The robotic assembly 300 further comprises a leave-behind module 330 that comprises a plurality of either spring-loaded and/or linear encoder positioned locking assemblies 332, whereby the position maintaining function is assured through remotely retractable one-way tires, a nautilus, a braced assembly, or another type of locking mechanism. The leave-behind module 330 is also coupled to a sliding bar and bracketed system 340 that supports each of the locking assemblies 332. The leave-behind module 330 can comprise any of a variety of use-case apparatus affixed to its exterior to perform functions such as, but not limited to, the functions listed infra.

Figure 17:
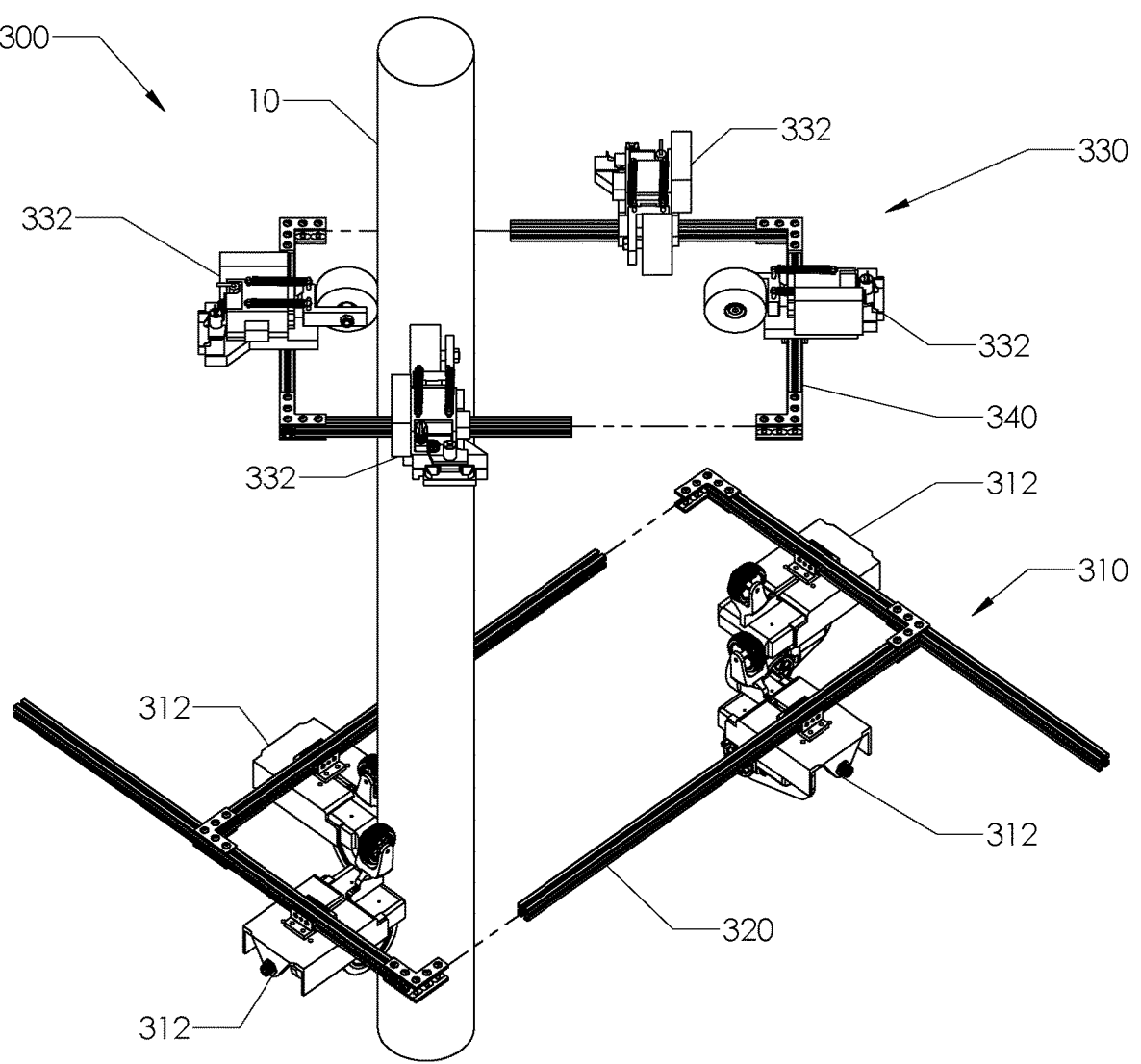
FIG. 17 illustrates a perspective, schematic view of the robotic assembly of FIG. 13, according to the present disclosure, wherein adjustable sliding bar and bracketed systems shown in FIG. 17 enable the robotic assembly to be coupled around various diameter structures.
Figure 18:
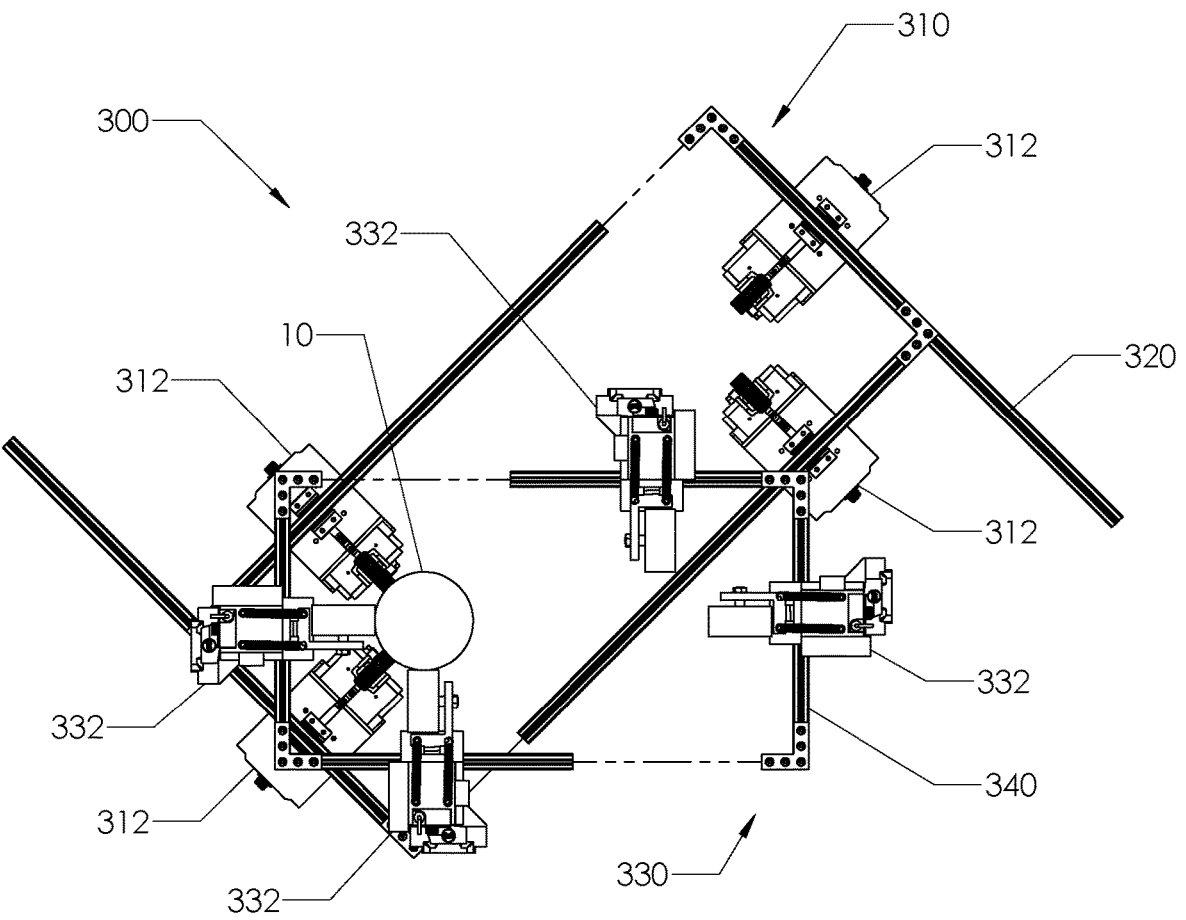
FIG. 18 illustrates a top down, schematic view of the robotic assembly of FIG. 13, according to the present disclosure, wherein the adjustable sliding bar and bracketed systems in FIG. 18 enable the robotic assembly to be coupled around various diameter structures.

FIG. 17 and FIG. 18 illustrate a perspective view and a top-down view, respectively, of the robotic assembly 300 of FIGS. 13-16, demonstrating the versatility and adjustability of the sliding bar and bracketed systems 320 and 340 to surround various diameter structures 10. The sliding bar and bracketed systems 320 and 340 of both the climbing/traversing robot 310 and leave-behind module 330 enables each assembly to be coupled around one side of a representative structure 10 before the robotic assembly 300 begins to traverse said structure 10. In more detail, the sliding bar and bracketed systems 320 and 340 may employ an L-bracket or T-bracket design that permits sliding and repositioning to enable on-site adjustments that accommodate varying diameter structures.

Figure 19:
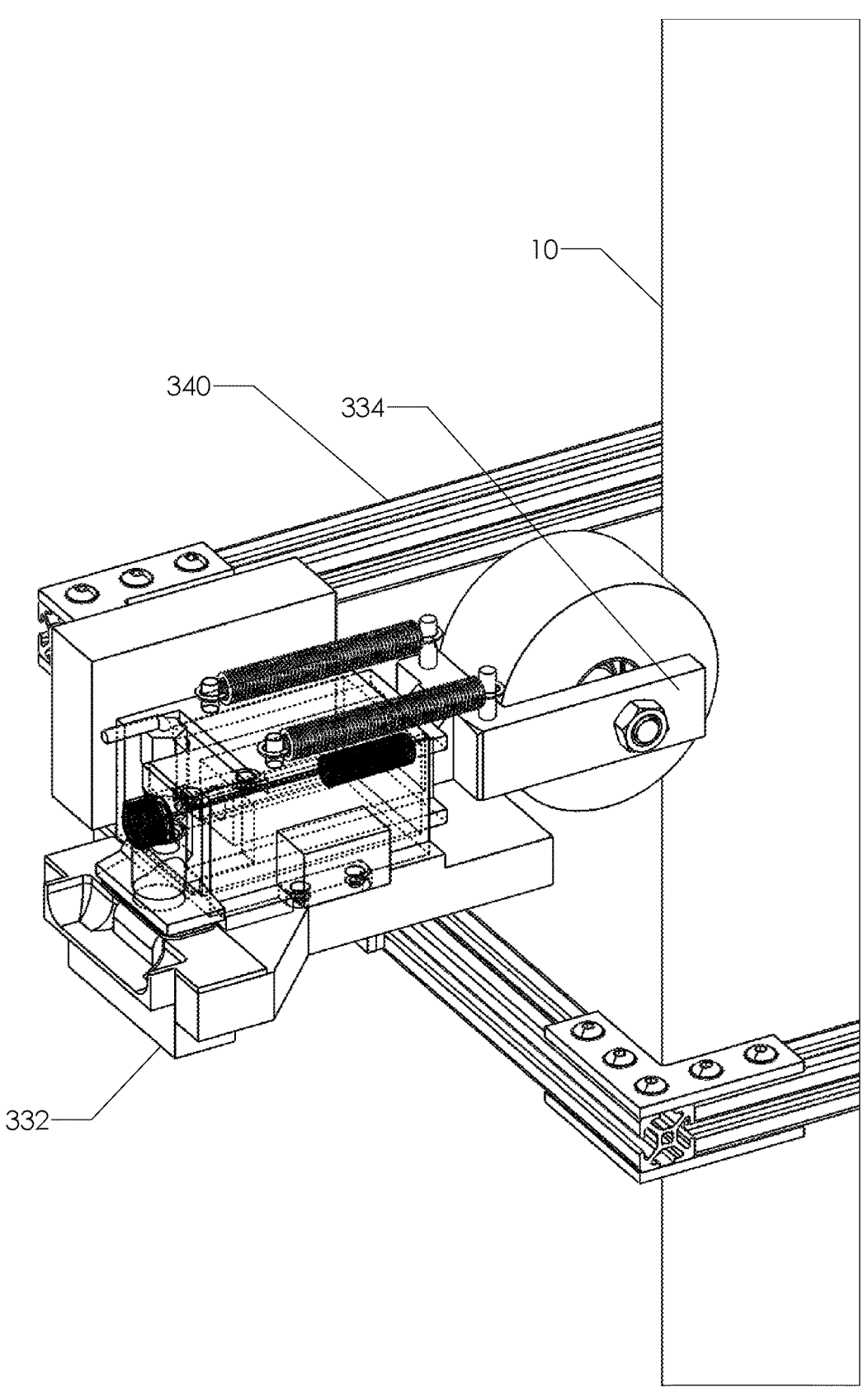
FIG. 19 illustrates a close-up, side, schematic view of an implementation of a locking and release mechanism of the leave-behind module of the robotic assembly of FIG. 13, according to the present disclosure.
Figure 20:
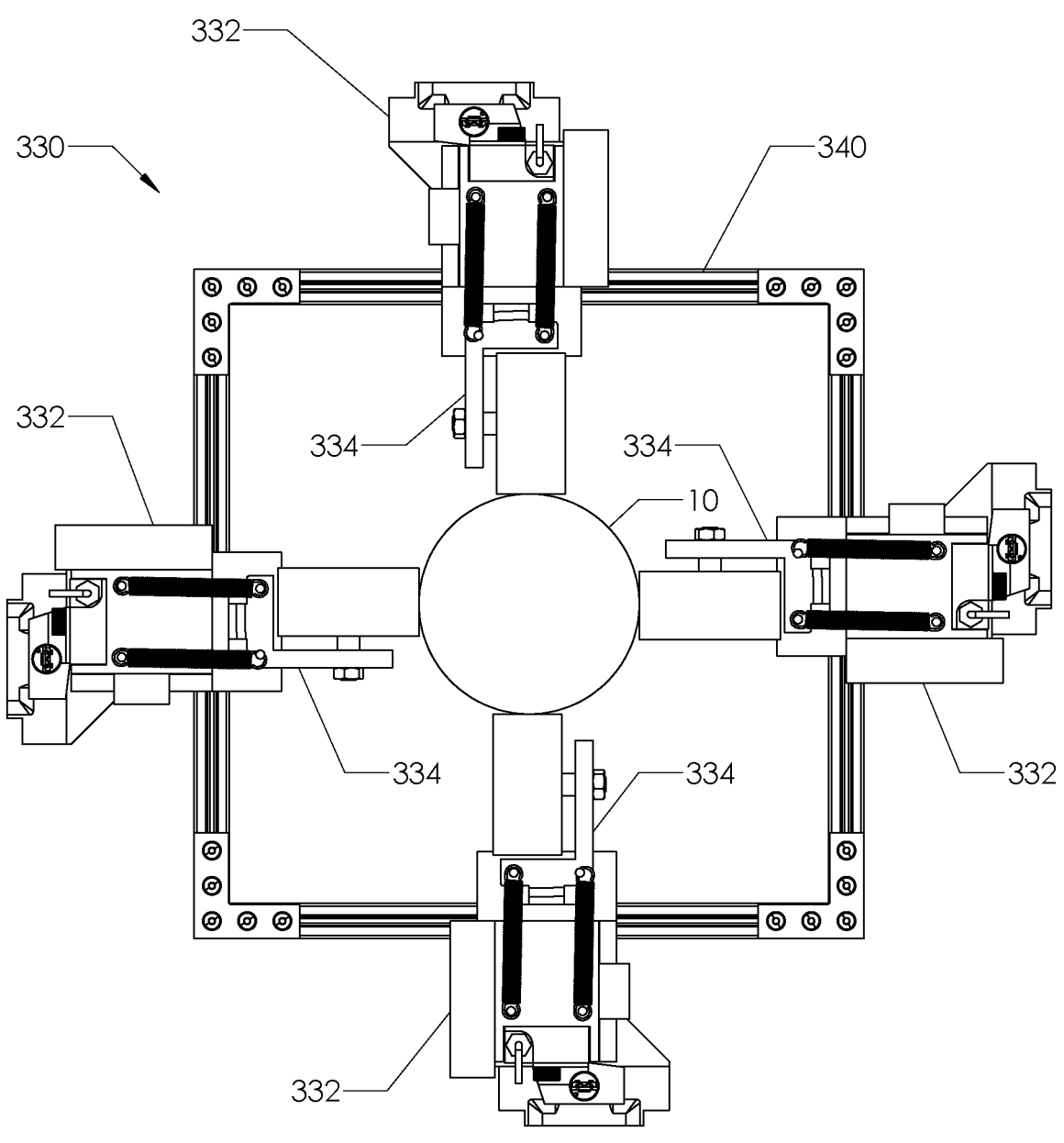
FIG. 20 illustrates a top-down view of an implementation of the leave-behind module of the robotic assembly of FIG. 13, according to the present disclosure.

FIG. 19 illustrates a close-up, partially see-through, side view, respectively, of an implementation of a locking assembly 332, and FIG. 20 illustrates a top-down view of an implementation of the leave-behind module 330 of FIGS. 13-16, according to the present disclosure. As depicted in this vertical instance, the leave-behind module 330 will be pushed into position by the climbing robot 310, and thereafter, the leave-behind module 330 will employ its locking assembly 332, which in this implementation is a one-way tire and gravity-lock into position, as depicted. In other implementations, the locking assembly may comprise a nautilus, a braced assembly, or another type of retractable locking mechanism. The one-way tire mount 334 can be remotely retracted to permit recovery of the leave-behind module 330 and its associated onboard functional apparatus, as desired. The remaining exposed sliding bar and bracketed system 340 can be affixed with a myriad of apparatus configured to perform functions, including, but not limited to, the functions listed infra.

Figure 21:
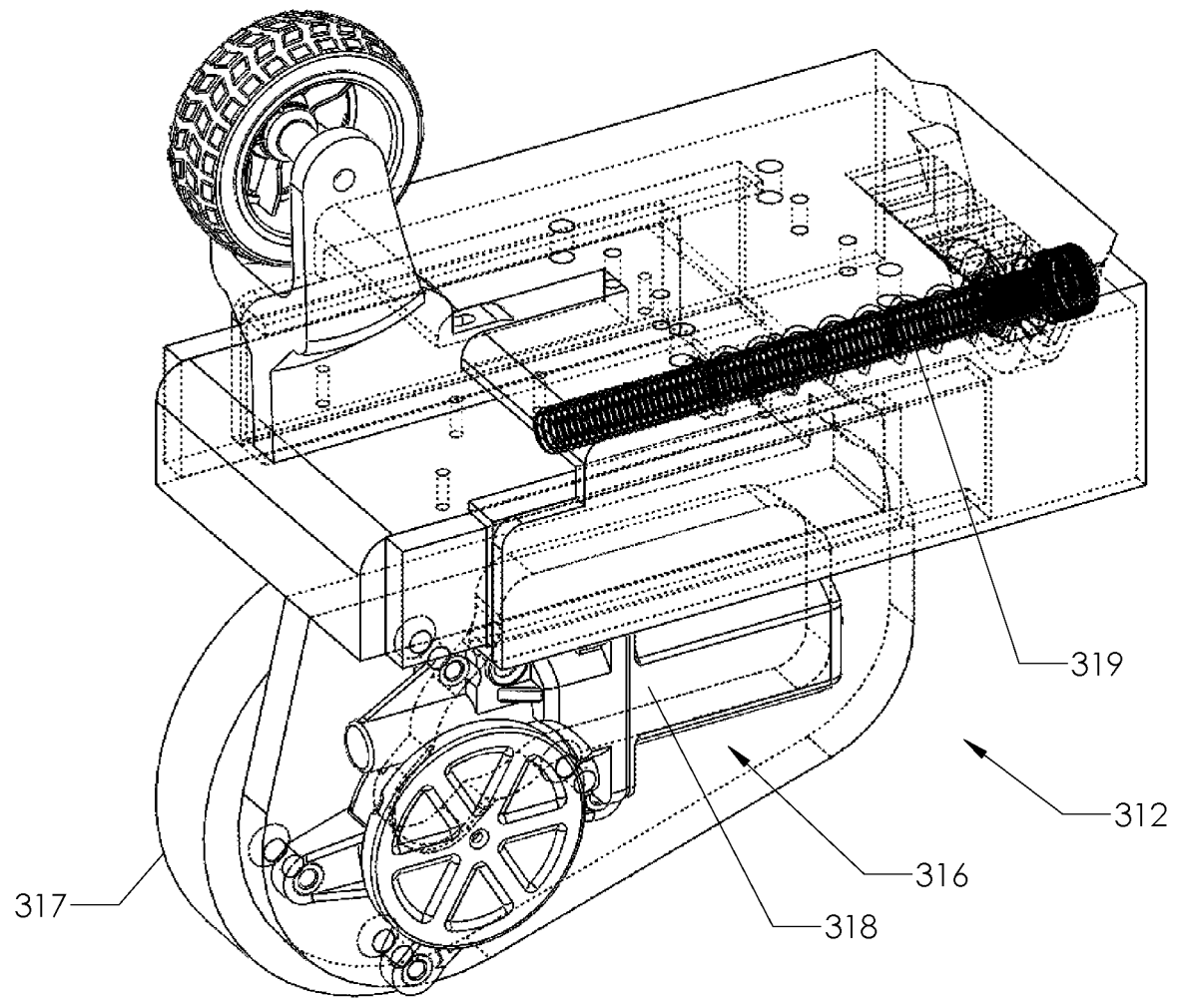
FIG. 21 illustrates a close-up, perspective, partially see-through, schematic view of an implementation of a linear actuator motor mechanism on a climbing robot of the robotic assembly of FIG. 13, according to the present disclosure.

FIG. 21 illustrates a close-up, perspective, partially see-through, schematic view of an implementation of a linear actuator motor mechanism 316 on one of the cars 312 of the climbing robot 310 of the robotic assembly 300 of FIGS. 13-16, according to the present disclosure. As depicted, the motor 318 driving the wheel 317 is coupled by a lead screw 319 extending from the linear actuator motor 318 disposed internally of the body of the car 312.

Figure 22:
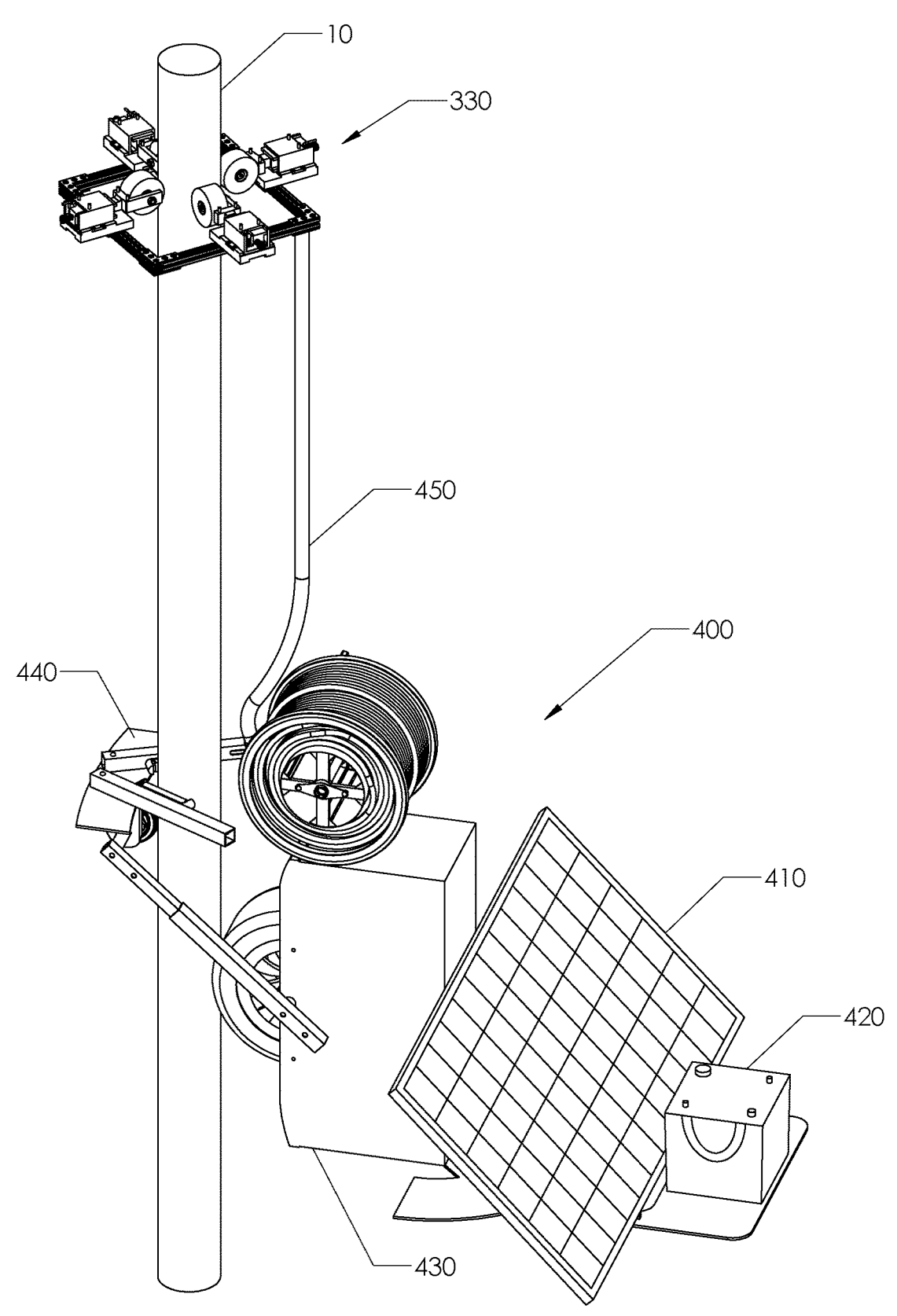
FIG. 22 illustrates a perspective, schematic view of the leave-behind module of the robotic assembly of FIG. 13, along with an implementation of a solar panel and battery back-up delivery assembly, according to the present disclosure.
Figure 23:
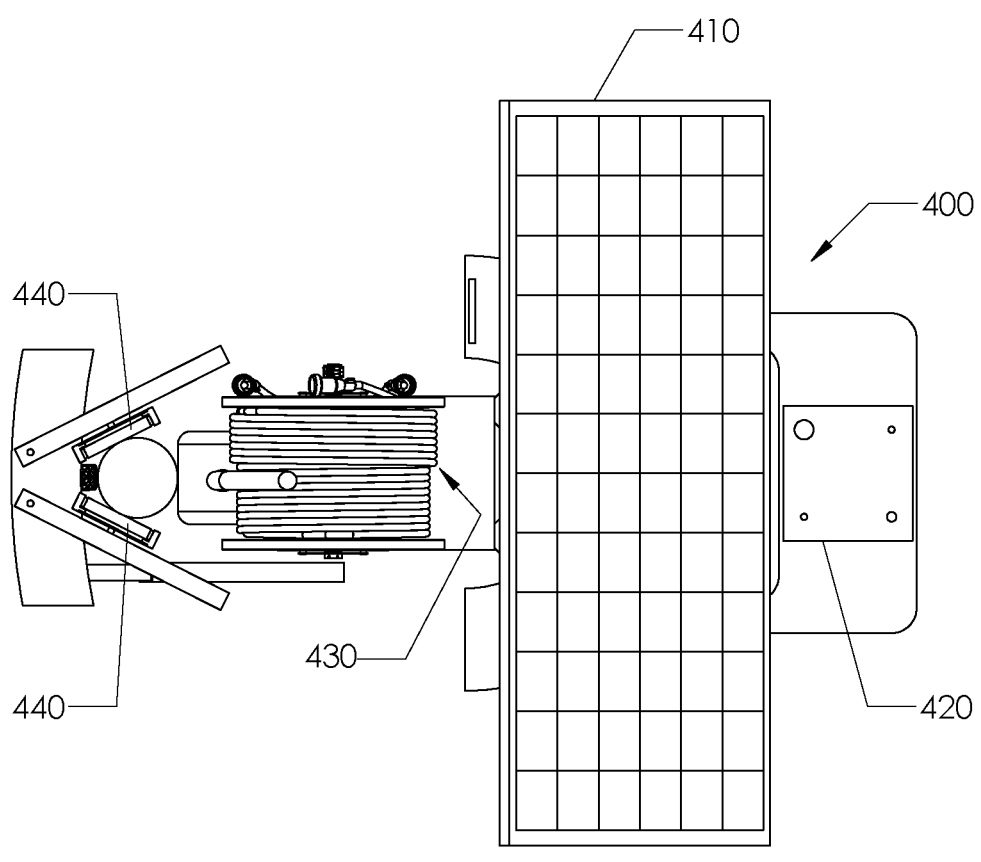
FIG. 23 illustrates a top-down view of the solar panel and battery back-up delivery assembly shown in FIG. 22, according to the present disclosure.

FIGS. 22 and 23 illustrate a perspective view and a top-down view, respectively, of an implementation of an independently operable solar panel and battery back-up delivery assembly 400 according to the present disclosure. In this view, the module 330 of the robotic assembly 300 is shown positioned on a representative substantially vertical structure 10, although the use-case would not be limited to just vertical applications. In this implementation, only the leave-behind module 330 and the solar panel and battery back-up delivery assembly 400 are shown. In some implementations, the delivery assembly 400 comprises a solar panel 410, a battery back-up 420, and a plurality of either spring-loaded and/or linear encoder positioned, motor-driven cars 430. The delivery assembly 400 further comprises a retractable cord 450 and a plurality of either spring-loaded and/or linear encoder positioned locking panels 440. The leave-behind module 330 (shown only in FIG. 22) can have a variety of apparatus affixed to its exterior to provide a variety of functionalities, such as, but not limited to, those use cases listed infra.

Figure 24:
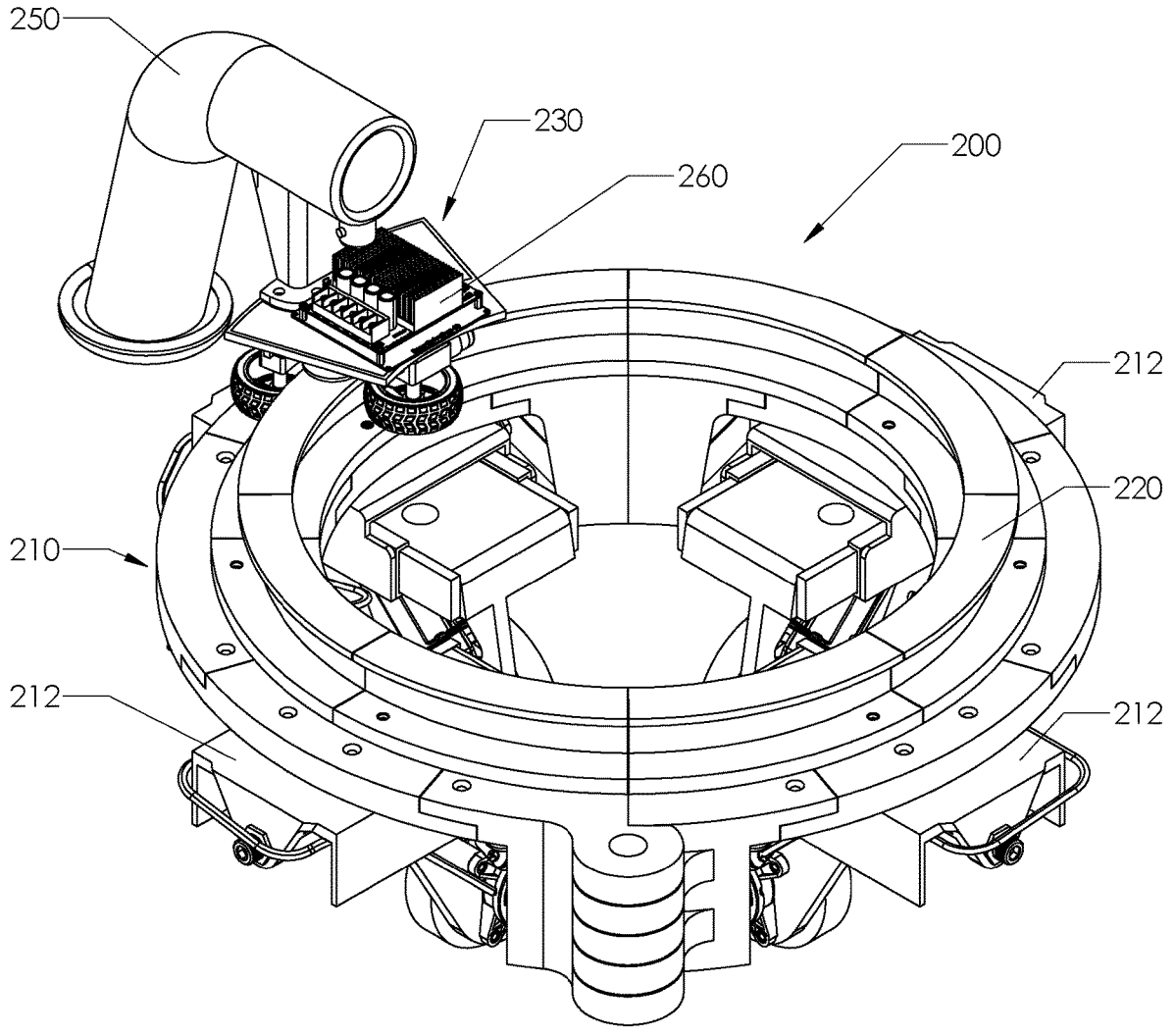
FIG. 24 illustrates a perspective, schematic view of the robotic assembly of FIG. 4 with a motor controller, according to the present disclosure.

FIG. 24 illustrates a perspective, schematic view of the robotic assembly 200 of FIGS. 4-9 with a motor controller 260 visible on the robotic assembly 200, according to the present disclosure.

Figure 25:
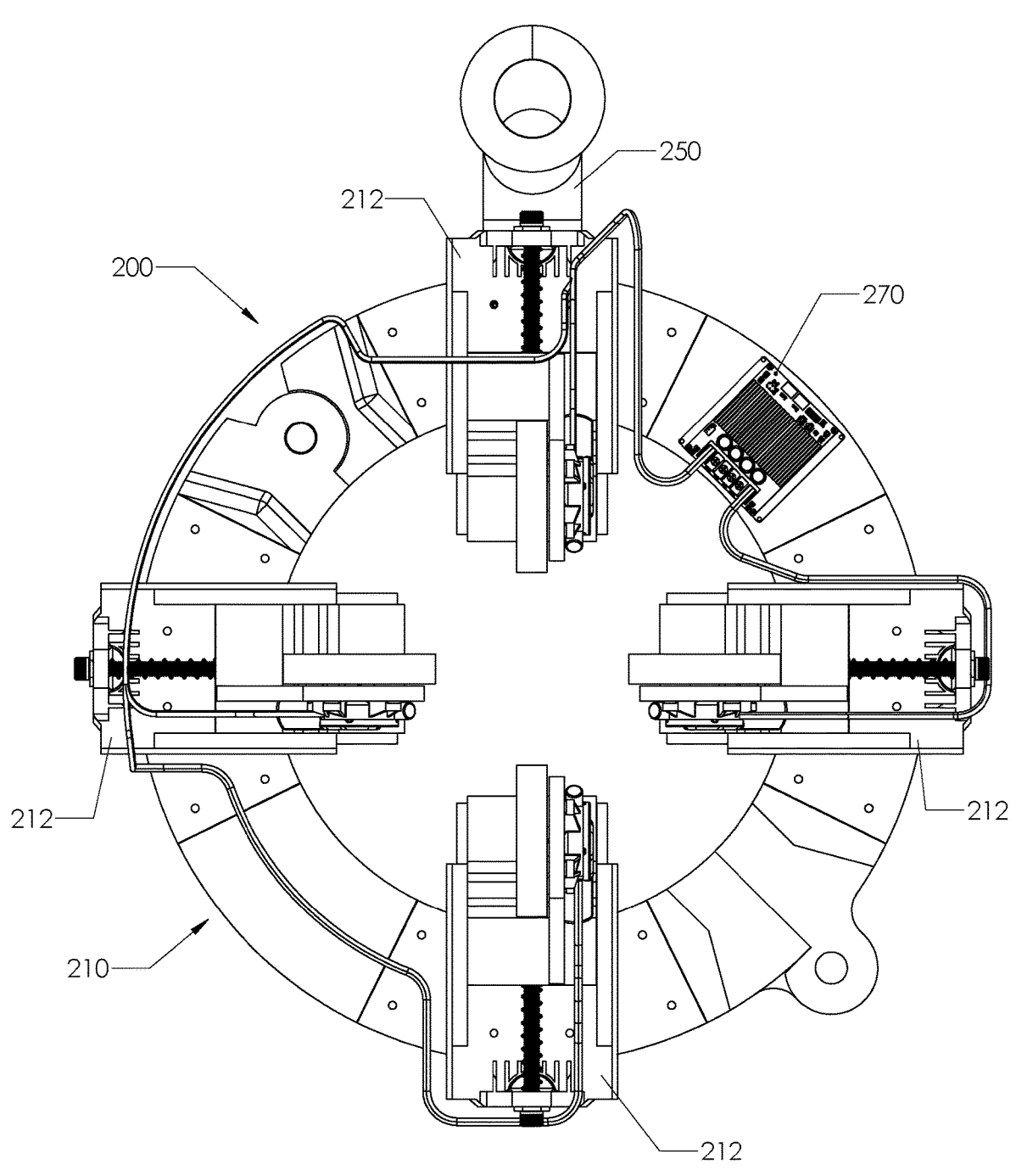
FIG. 25 illustrates a bottom up, schematic view of the robotic assembly of FIG. 4, showing representative routing of a common motor controller configuration, according to the present disclosure.

FIG. 25 illustrates a bottom up, schematic view of the robotic assembly 200 of FIGS. 4-9, showing a different motor controller 270 and representative routing of a common motor controller configuration, according to the present disclosure.

Figure 26:
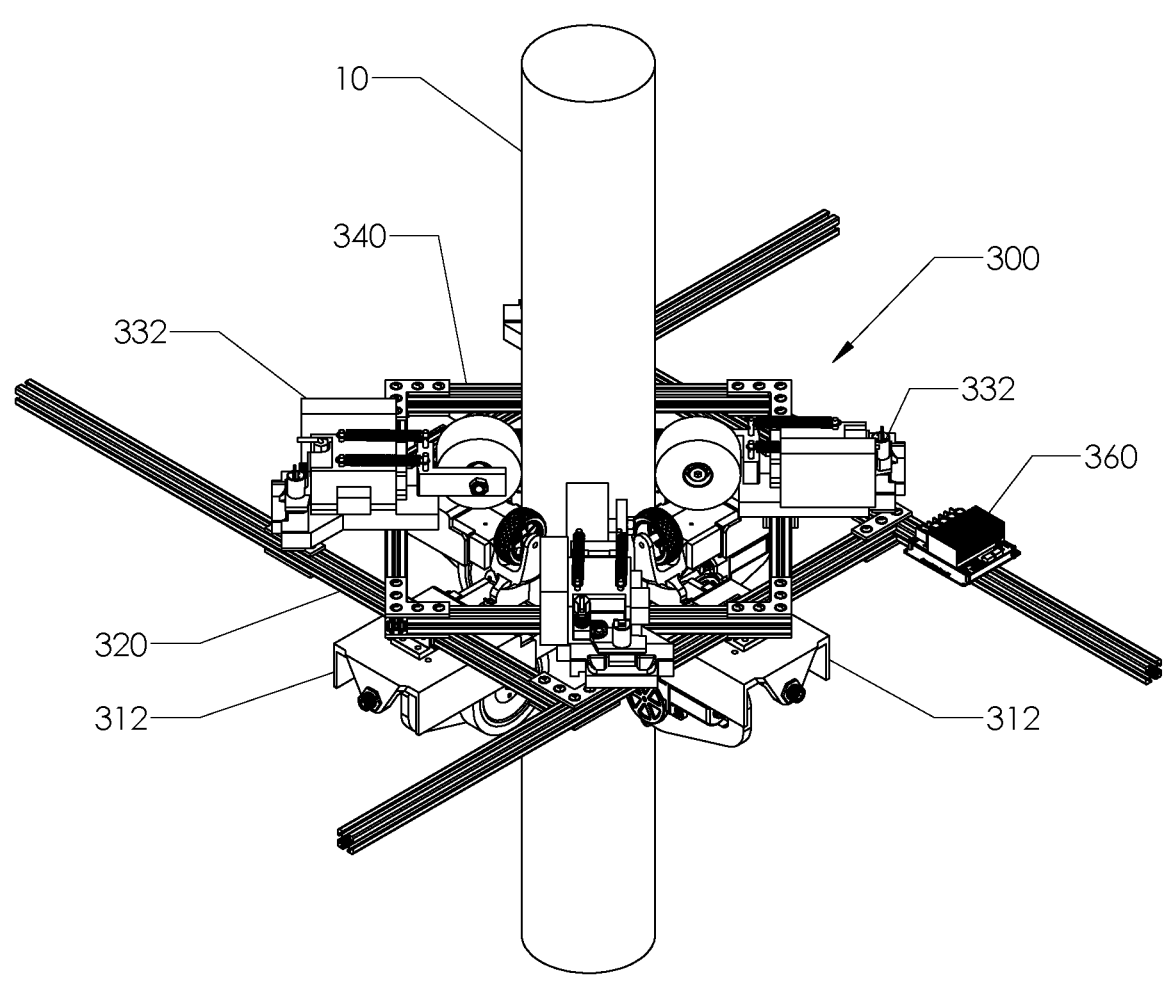
FIG. 26 illustrates a perspective, schematic view of the robotic assembly of FIG. 13 with a motor controller and depicted atop a representative substantially vertical structure, according to the present disclosure.
Figure 27:
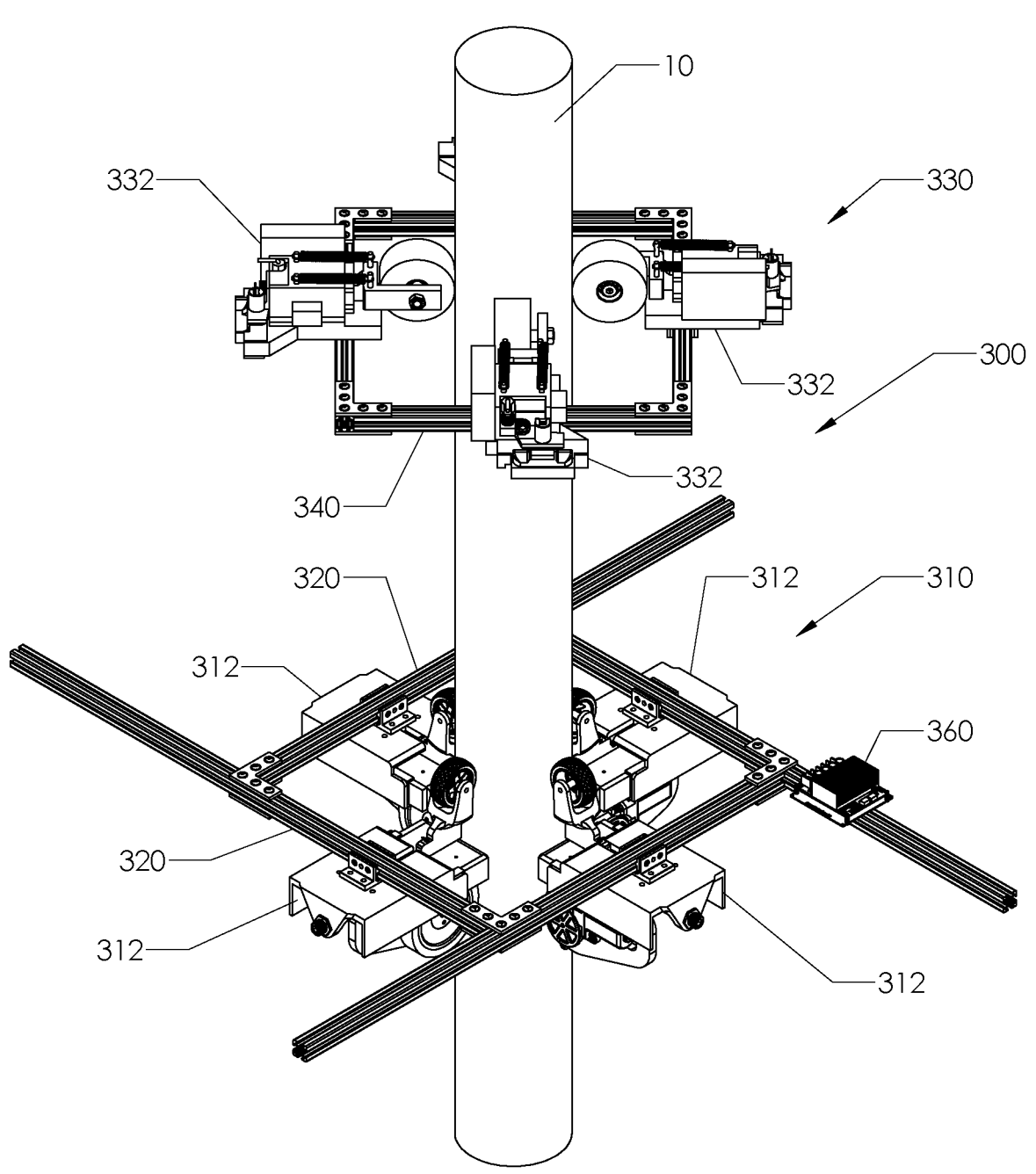
FIG. 27 illustrates a perspective, schematic view of the robotic assembly of FIG. 13 with the leave-behind module and the climbing robot separated and depicted atop a representative substantially vertical structure, according to the present disclosure.

FIG. 26 and FIG. 27 illustrates perspective, schematic views of both the climbing robot 310 and leave-behind module 330 of the robotic assembly 300 of FIGS. 13-18, with FIG. 26 demonstrating the leave-behind module 330 locked in position, and with a motor controller 360 visible on the robotic assembly 300, according to the present disclosure.

While the robotic assemblies of the present disclosure have been described for use in connection with climbing, traversing, circumferential applying and installing leave-behind modules on substantially vertical and horizontal structures, such as trees, poles, pipes, and columns, the robotic assemblies of the present disclosure may be reconfigured for other purposes. For example, the climbing robot may be replaced, or the circumferential or leave-behind modules might be modified with other use-case apparatus, with functionalities such as:

a. A tree-trimming blade, sap/maple extrusion system with drill/tap function, bee hive monitoring, bark sampling, etc.

b. A camera and/or other recording system that includes remote and/or recovery viewing/monitoring to include infrared and near-IR, ultraviolet, night vision, thermal vision, small aperture radar, or any other frequency across the electromagnetic spectrum;

c. A radio/satellite/cell phone communications relay receivers or transmitters (Rx/Tx) or recorder, whether triggered manually, remotely, automated, or via an external event listed herein, but not limited thereto;

d. A Wi-Fi extender system Rx/Tx, to include but not limited to 860/900 MHz through and including 60 GHz and/or any 802.11 standard wireless communications infrastructure;

e. Inclusion of lighting (both within and outside the visible range), to include holiday lighting, security lighting, ambient lighting, remotely adjustable and/or fixed spot lighting, decorative and/or kinetic/non-kinetic laser and/or mood lighting to include disco lighting, and the likes, and/or police/fire lighting configurations, all of which may or may not be remotely controlled, etc.

f. Any modification of the above with or without solar panels (see FIG. 22 and FIG. 23) and/or direct AC/DC power supplies and/or alternate power sources (e.g., wind).

In some alternative implementations, the robotic assemblies, the climbing robots, and/or the circumferential or leave-behind modules may be modified to accommodate:

a. Weather proofing, thermal protection, electro-static discharge protection;

b. Armored and/or structural reinforcements, including but not limited to explosives, ballistics, concussive, and/or shock/drop protection;

c. Zeroize/Tamper System (e.g., auto detonation/destruct system if tampered with);

d. Remote or automated deployment of weapon systems, be they kinetic or non-kinetic, and/or electromagnetic pulse induction, directed energies (to include but not limited to microwaves and lasers), acoustic transmissions, and the associated Rx/Tx activation systems therein;

e. Underwater operations covering any use-case in this section to include the destruction of the traversed system;

f. Integration of an x-ray scan system to include Computer Aided Tomography (CAT) scans, acoustic/sonic scans, and the like;

g. Travel or climbing in directions other than vertical, including but not limited to horizontal and/or diagonal excursions;

h. Speakers/Acoustic Rx/Tx of the exterior environment to include transmissions through the traversal structure itself;

i. Painting/repair functionality either from or on the traversed tree/pipe/pole/structure;

j. Fan and/or force air systems to include any contained gas/liquid propellants and/or associated cooling systems;

k. Vertical garden/planting system to include aeroponics, hydroponics, traditional earth, and/or their associated water delivery systems and/or fruit/vegetable extraction, mashing system, or seed deployment;

l. Cleaning/scrubbing functionalities onto or from the traversed tree/pipe/pole/structure;

m. Elevator ferry functions and/or pulley systems and/or claws, including but not limited to, providing transfer of tools on a construction job site, delivering products to multistory structures, etc.

n. Surface topography, tomography, and/or extended services that capture/transmit/retain weather, foliage, animal/wildlife patterns of life, human movements, ornithological studies, stellar monitoring, etc.

o. Nuclear, radiological, biological, and/or chemical detection/identification and/or pollution monitoring systems that, for example, might provide monitoring and/or early warning and/or impending danger;

p. Alarm/alert system integrations to include the emergency broadcast system, AMBER alert, tsunami alert, and dangers;

q. Traffic light emergency replacement system—examples include but are not limited to a 4-way intersection alternative to downed power system permitting quick deployment and networked operations in disaster relief environments;

r. Seismic and tsunami sensors systems;

S. Personnel, animal, pest, wrangling system, and/or hunting functionalities, including but not limited to net deployment, animal treat dispenser, and/or alternative systems that attract or deter any of the above;

t. Integration of projector and/or screen deployment system (i.e., outdoor movie viewing system);

u. Water misting and/or fragrance deployment;

v. Water level monitoring;

w. Fire detection;

x. Modification of the climbing robot to include means of traversing limbed trees, utility, light poles that contain obstructions via either removal of said obstruction, or alternative climbing techniques that involve, but are not limited to, additional hinge and/or rotational axis points that permit climbing of said structure.

In some alternative implementations, the motor/tires subsystems of the robotic assemblies described herein may be reconfigured/reoriented so as to enable traversal on the interior of a structure such as a pipe or pole, thereby enabling:

a. Employment into mineshafts, airshafts, and other tight non-human traversable spaces;

b. Determination/assertion of human-safe atmospheric conditions;

c. Delivery and/or extraction of items;

d. Advanced digging and/or obstacle/obstruction removal;

e. Delivery of explosive charges;

f. Air ducting and/or HVAC examination/traversals;

g. Sewer inspection/repairs;

h. Inspection and/or servicing of either under/overground ground cable, fiber optics, electrical, water delivery, and/or gas/pneumatic piping;

i. Any interior traversal that incorporates any one of the systems annotated infra.

It is to be understood the implementations of the present disclosure are not limited to the particular systems or methods described herein which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding implementations described herein may be utilized according to the present disclosure. Accordingly, the appended claims are intended to include within their scope such processes, machines, manufacture, compositions of matter, means, methods, or steps.

The invention claimed is:

1. A robotic assembly comprising:
a robot;
a module; wherein the robot is configured to selectively move the module substantially linearly; and
a rail system; wherein the module is configured to selectively traverse the rail system;
wherein the module performs a function when it selectively traverses the rail system; and
further comprising a funnel mechanism configured to aid the module to perform the function when it selectively traverses the rail system.

2. The robotic assembly of claim 1, wherein:
the robot comprises at least one motor-driven component.

3. The robotic assembly of claim 1, wherein:
the robot is coupled to the rail system; and
the module is coupled to the rail system.

4. A robotic assembly comprising:
a robot;
a module; wherein the robot is configured to selectively move the module substantially linearly; and
a rail system; wherein the module is configured to selectively traverse the rail system;
wherein the module performs a function when it selectively traverses the rail system; and
wherein the robot is further configured to move the rail system substantially linearly.

5. The robotic assembly of claim 4, wherein:
the robot comprises at least one motor-driven component.

6. The robotic assembly of claim 4, wherein:
the rail system comprises a substantially circumferential track.

7. The robotic assembly of claim 4, further comprising:
a cantilever bridge;
wherein the cantilever bridge is coupled between the robot and the rail system.

8. The robotic assembly of claim 4, further comprising:
a substantially circular bridge comprising a plurality of portions joined together by at least one hinge;
wherein the rail system is substantially circular and comprises a plurality of sections joined together by at least one hinge; and
wherein the rail system sections are carried by the bridge portions.

9. The robotic assembly of claim 4, wherein:
the robot is configured to selectively move both the module and the rail system substantially linearly while the module is performing the function.

10. The robotic assembly of claim 4, wherein:
the robot is coupled to the rail system; and
the module is coupled to the rail system.

11. A robotic assembly comprising:
a robot; and
a module;
wherein the robot is configured to selectively move the module substantially linearly;
a first sliding bar and bracketed system configured to extend around a structure and support the robot; and a second sliding bar and bracketed system configured to extend around the structure and support the module.

12. The robotic assembly of claim 11, wherein:

the first and second sliding bar and bracketed systems are adjustable to extend around structures of varying sizes.

13. The robotic assembly of claim 11, wherein:

the module comprises a retractable locking assembly.

14. The robotic assembly of claim 11, wherein:

the robot is configured to separate from the module after selectively moving the module substantially linearly to a desired location.

15. The robotic assembly of claim 11, wherein:

the module is configured to selectively retain its position after the robot selectively moves the module substantially linearly to a desired location.

16. The robotic assembly of claim 15, wherein:

the module selectively performs a function while the module selectively retains its position in the desired location.

17. The robotic assembly of claim 15, wherein:

the module is configured to selectively release its position to remove the module from the desired location.

18. The robotic assembly of claim 16, further comprising:

a solar panel and battery back-up delivery assembly configured to move independently of the robot and provide power to the module to perform the function.

19. The robotic assembly of claim 11, further comprising:

a motor controller operatively coupled to the robot, the module, or both the robot and the module.

* * * * *